United States Patent
Murthy et al.

(10) Patent No.: US 10,464,832 B2
(45) Date of Patent: Nov. 5, 2019

(54) APPARATUS FOR WATER TREATMENT USING A PHYSICAL SEPARATOR

(71) Applicant: D.C. Water & Sewer Authority, Washington, DC (US)

(72) Inventors: Sudhir N. Murthy, Herndon, VA (US); Bernhard Wett, Innsbruck (AT); Haydee Declippeleir, Hamme (BE)

(73) Assignee: D.C. Water & Sewer Authority, Washington, DC (US)

( * ) Notice: Subject to any disclaimer, the term of this patent is extended or adjusted under 35 U.S.C. 154(b) by 0 days.

(21) Appl. No.: 15/090,092

(22) Filed: Apr. 4, 2016

(65) Prior Publication Data

US 2016/0272521 A1 Sep. 22, 2016

Related U.S. Application Data

(63) Continuation-in-part of application No. 14/033,686, filed on Sep. 23, 2013, now Pat. No. 9,802,847, and a continuation-in-part of application No. 14/032,952, filed on Sep. 20, 2013, now Pat. No. 10,287,195.

(60) Provisional application No. 61/703,844, filed on Sep. 21, 2012.

(51) Int. Cl.
  *C02F 3/30* (2006.01)
  *C02F 3/12* (2006.01)
  *C02F 1/52* (2006.01)

(52) U.S. Cl.
  CPC ............ *C02F 3/1221* (2013.01); *C02F 3/307* (2013.01); *C02F 1/52* (2013.01); *C02F 3/1226* (2013.01); *C02F 2209/10* (2013.01); *C02F 2209/105* (2013.01); *C02F 2303/24* (2013.01); *Y02W 10/15* (2015.05)

(58) Field of Classification Search
  CPC .............................. C02F 3/1221; C02F 3/307
  See application file for complete search history.

(56) References Cited

U.S. PATENT DOCUMENTS

| 3,467,699 A | 9/1969 | Bamforth |
| 3,563,355 A * | 2/1971 | Goodson ............... F16D 48/066 |
| | | 192/104 F |
| 3,747,771 A | 7/1973 | Ruthrof |
| 3,959,124 A | 5/1976 | Tchobanoglous |

(Continued)

FOREIGN PATENT DOCUMENTS

| CN | 2166870 Y | 6/1994 |
| CN | 101300196 | 11/2008 |

(Continued)

OTHER PUBLICATIONS

U.S. Appl. No. 60/879,373, filed Jan. 9, 2007 published contemporaneously with PGPub 20080203015 (Year: 2008).*

(Continued)

*Primary Examiner* — Chester T Barry
(74) *Attorney, Agent, or Firm* — Blank Rome LLP

(57) ABSTRACT

An apparatus and method for selecting, retaining or bioaugmenting solids in an activated sludge process for improving wastewater treatment using a screen device. If desired, the screen device may include a drum, and the rotating speed of the drum may be used to control the solids retained. Effluent including waste biomass may exit the screen device. No other discharge unit from the screen device may be required.

15 Claims, 20 Drawing Sheets

(56) References Cited

U.S. PATENT DOCUMENTS

| | | | |
|---|---|---|---|
| 4,014,747 | A | 3/1977 | Kenyon |
| 4,236,999 | A | 12/1980 | Burgess |
| 4,725,364 | A | 2/1988 | Hurley |
| 5,361,909 | A | 11/1994 | Gemmer |
| 5,397,755 | A | 3/1995 | Parker |
| 5,824,222 | A | 10/1998 | Keyser et al. |
| 5,910,245 | A | 6/1999 | Bernhardt |
| 6,569,335 | B1 | 5/2003 | Johnson |
| 6,814,868 | B2 | 11/2004 | Phagoo et al. |
| 7,070,693 | B2 | 7/2006 | Kelly |
| 7,569,147 | B2 | 8/2009 | Curtis et al. |
| 7,611,632 | B1 | 11/2009 | Wang |
| 9,039,897 | B2 * | 5/2015 | Stroot .................... C02F 3/006 210/259 |
| 2002/0121477 | A1 * | 9/2002 | Oswald ................... C02F 3/00 210/603 |
| 2003/0006200 | A1 | 1/2003 | Phagoo et al. |
| 2007/0085998 | A1 | 4/2007 | Brestel |
| 2008/0203015 | A1 * | 8/2008 | Marston .................. C02F 3/12 210/610 |
| 2008/0314828 | A1 | 12/2008 | Campbell |
| 2010/0006501 | A1 | 1/2010 | Laurell |
| 2010/0264082 | A1 | 10/2010 | Conner |
| 2011/0017664 | A1 | 1/2011 | Conner et al. |
| 2011/0036771 | A1 * | 2/2011 | Woodard .............. C02F 3/2846 210/608 |
| 2011/0186513 | A1 | 8/2011 | Vuong |
| 2012/0085650 | A1 * | 4/2012 | Hartle ...................... B03C 3/68 204/554 |
| 2013/0069759 | A1 | 3/2013 | Padgett |
| 2013/0277302 | A1 | 10/2013 | Doelle et al. |
| 2013/0306533 | A1 * | 11/2013 | Fukuzaki ............. C02F 3/2846 210/143 |
| 2014/0224730 | A1 | 8/2014 | Conner et al. |
| 2014/0309607 | A1 | 10/2014 | Richlen |
| 2016/0272521 | A1 * | 9/2016 | Murthy ................. C02F 3/1221 |

FOREIGN PATENT DOCUMENTS

| | | |
|---|---|---|
| CN | 101479200 | 7/2009 |
| CN | 102066269 | 5/2011 |
| CN | 102548911 | 7/2012 |
| EP | 1 595 851 A1 | 11/2005 |
| JP | 2000343098 A | 12/2000 |
| JP | 2003093908 A | 4/2003 |
| JP | 2005349304 A | 12/2005 |
| JP | 2006035069 A | 2/2006 |
| JP | 2012106176 A | 6/2012 |
| KR | 2007076919 A | 7/2007 |
| WO | WO 94/24056 | 10/1994 |
| WO | WO 2013/039582 A1 | 3/2013 |

OTHER PUBLICATIONS

Chinese Office and the English language translation of Chinese Office action dated Feb. 26, 2016 issued in connection with corresponding Chinese Application 201380049244.2.

Japanese Office Action and its English language translation dated May 9, 2017, issued in connection with corresponding Japanese Application No. 2015-533255.

Curvers, "Compressibility of biotic sludges—an osmotic approach," *Chem. Eng. J.*, 166 (2011) p. 678-686.

Singapore Written Opinion, dated Mar. 24, 2016, pp. 1-5, issued in connection with corresponding Singapore Application 11201502140T.

Singapore Written Opinion, dated Nov. 15, 2016, pp. 1-4, issued in connection with corresponding Singapore Application 11201502140T.

H. De Clippelieir et al., "Screens as a Method for Selective Anammox Retention in Single Stage Deammonification Processes". Fiscal Year 2013—Studies, research papers, and analyses.

M. Joyce et al., "Replacement of Activated Sludge Secondary Clarifiers by Dynamic Straining", May 1975.

D. Sen et al., "Performance of Fixed Film Media Integrated in Activated Sludge Reactors to Enhance Nitrogen Removal", 1995.

Communication Pursuant to Article 94(3) EPC, Application No. 13 839 299.8, dated Aug. 6, 2018.

Communication Pursuant to Rule 114(2) EPC, Application No. 13 839 299.8, dated Jul. 20, 2018.

* cited by examiner

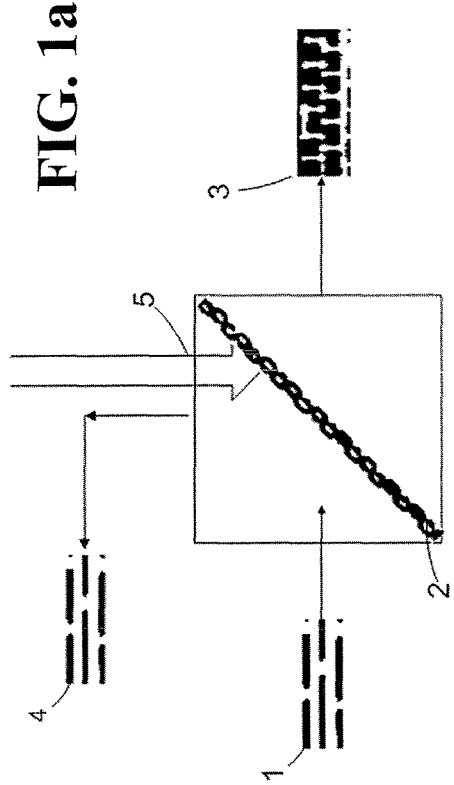
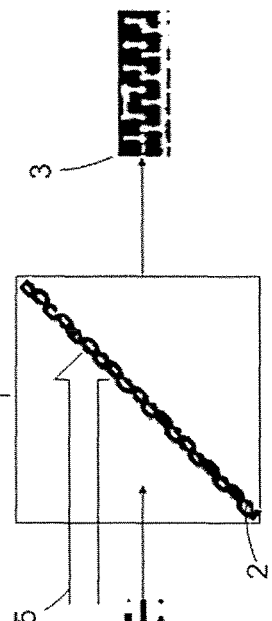
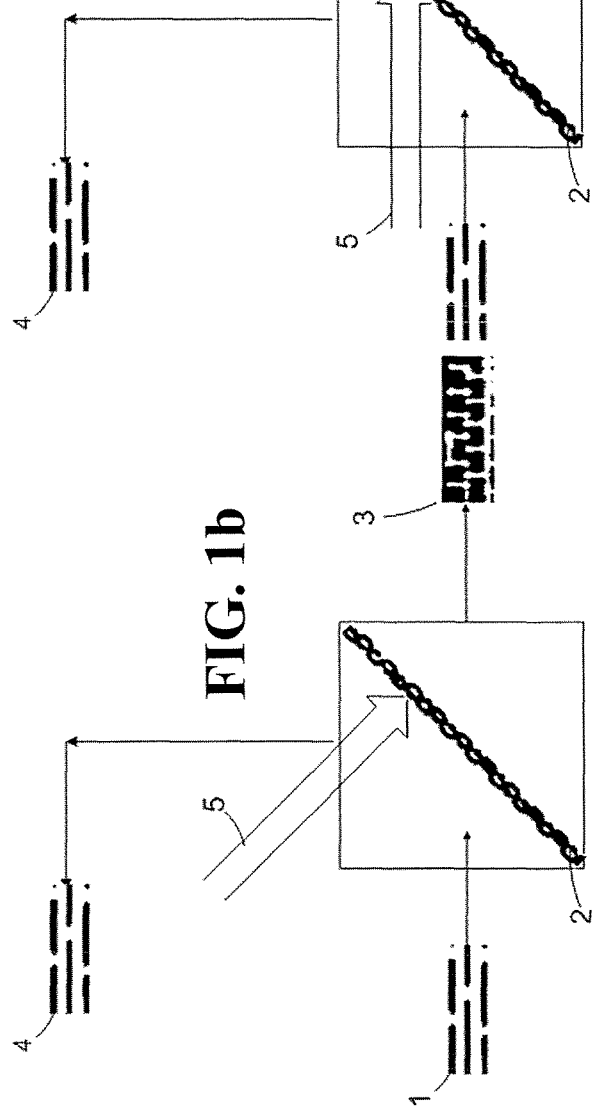

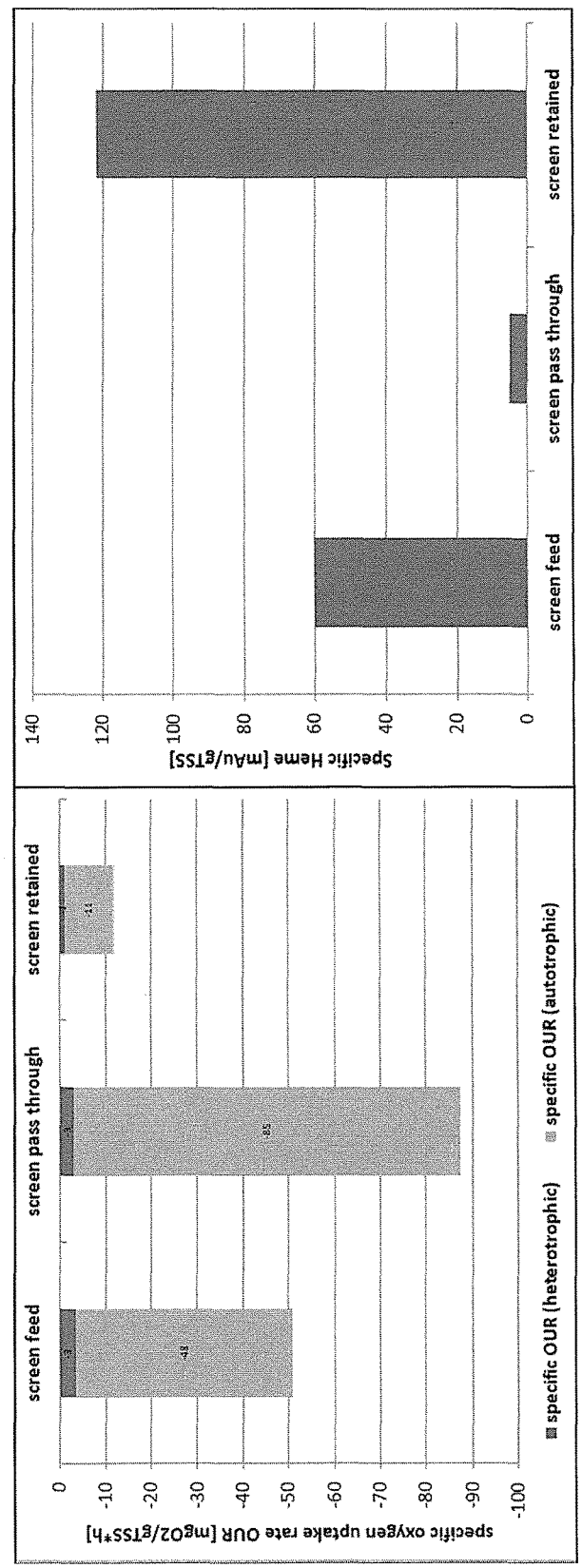
FIG. 20b Anaerobic Activity
FIG. 20a Aerobic Activity

APPARATUS FOR WATER TREATMENT USING A PHYSICAL SEPARATOR

CROSS-REFERENCE TO RELATED APPLICATIONS

This application is a continuation-in-part of patent application Ser. No. 14/032,952, filed on Sep. 20, 2013, now U.S. Pat. No. 10,287,195. This application is also a continuation-in-part of patent application Ser. No. 14/033,686, filed on Sep. 23, 2013, now U.S. Pat. No. 9,802,847.

Screening of wastewater is a common method of treatment at wastewater treatment plants. Wastewater screens have been used to remove large or inert solids for collection and disposal for over a century. Wastewater screening to remove such debris typically occurs in an upstream process to protect downstream processes from such materials. More recently, screens have been used within the activated sludge process itself to select and remove inert material.

U.S. patent applications 61/703,844, Ser. No. 14/032,952, and Ser. No. 14/033,686, and international patent application PCT/US13/60962 filed Sep. 20, 2013), which also disclose the use of screens to select and retain solids, or to physically synthesize biological solids of appropriate structures to enhance activated sludge performance, are hereby incorporated by reference in their entirety.

Physical separation to allow for selection of two fractions based on physical forces is a key aspect of this application. The separation can occur based on physical factors such as particle size, diffusion, coagulation, flocculation, filtration, shear, viscosity, gravimetry, floatation, or compressibility. A device such as a screen along with associated tanks and equipment can promote one or multiple of these physical forces for selection within the same device that can then uncouple the solids residence time of retained and non-retained fractions.

SUMMARY

The present invention relates to the use of a device such as a screen to retain solids, or to physically synthesize biological solids of appropriate structures to enhance activated sludge performance.

The disclosed embodiments include a selection process using screens for retaining particulate constituents based on physical factors such as particle size diffusion, coagulation, flocculation, filtration, shear, viscosity, gravimetry, floatation, or compressibility thereof. In particular, devices such as screens are used in the activated sludge process to 'mine' and 'retain' specific types of solids, and these retained solids improve process performance. This ability to mine activated sludge solids of a specific range of size, compressibility and shear resistance through selection and retention of material is a key feature of the embodiments of the present disclosure. Physical forces (shear/tangential stress and/or normal stress) are used to coagulate, flocculate or filter solids, where these coagulated, flocculated and filtered materials are retained. Further, in any screen type the particulate retained may be controlled, such as by varying the rotating speed of a drum (or a drum-sieve) in the screen, varying vibration in a vibrating screen, etc. The present disclosure is not necessarily limited for use in connection with wastewater. The apparatuses and methods described herein may be used in connection with treatment of water other than wastewater. For example, the present apparatuses and methods may be used to remove nutrients from agricultural runoff, and/or to treat leachate from a solid waste operation, animal manure, water from an aquaculture system, and digestate or sludge from an anaerobic digestion process, and address groundwater pollution, treat drinking water and treat hazardous wastes.

The present invention is not limited to the particular systems and devices shown and described herein. Devices other than screens that control single or multiple physical forces can be used as well. Advantages may be achieved by combining and/or operating all or some of the features described herein and shown in FIGS. 1-20*b*.

BRIEF DESCRIPTION OF THE SEVERAL VIEWS OF THE DRAWINGS

FIGS. 1*a*-1*c* show a screening apparatus according to an example embodiment, including a screen wash applying stress on particles at three different angles on either the retained or pass through side.

FIG. 20a and FIG. 20b are tables comparing the aerobic vs anaerobic activity distribution measured showing the distribution of anammox (FIG. 20b), where a large fraction of anammox is in the retained and only a small fraction of anammox is in the pass through, while FIG. 20a shows a large fraction of the AOB (organism desired to be wasted more rapidly) is present in the pass-through effluent.

DETAILED DESCRIPTION

Figure 2:
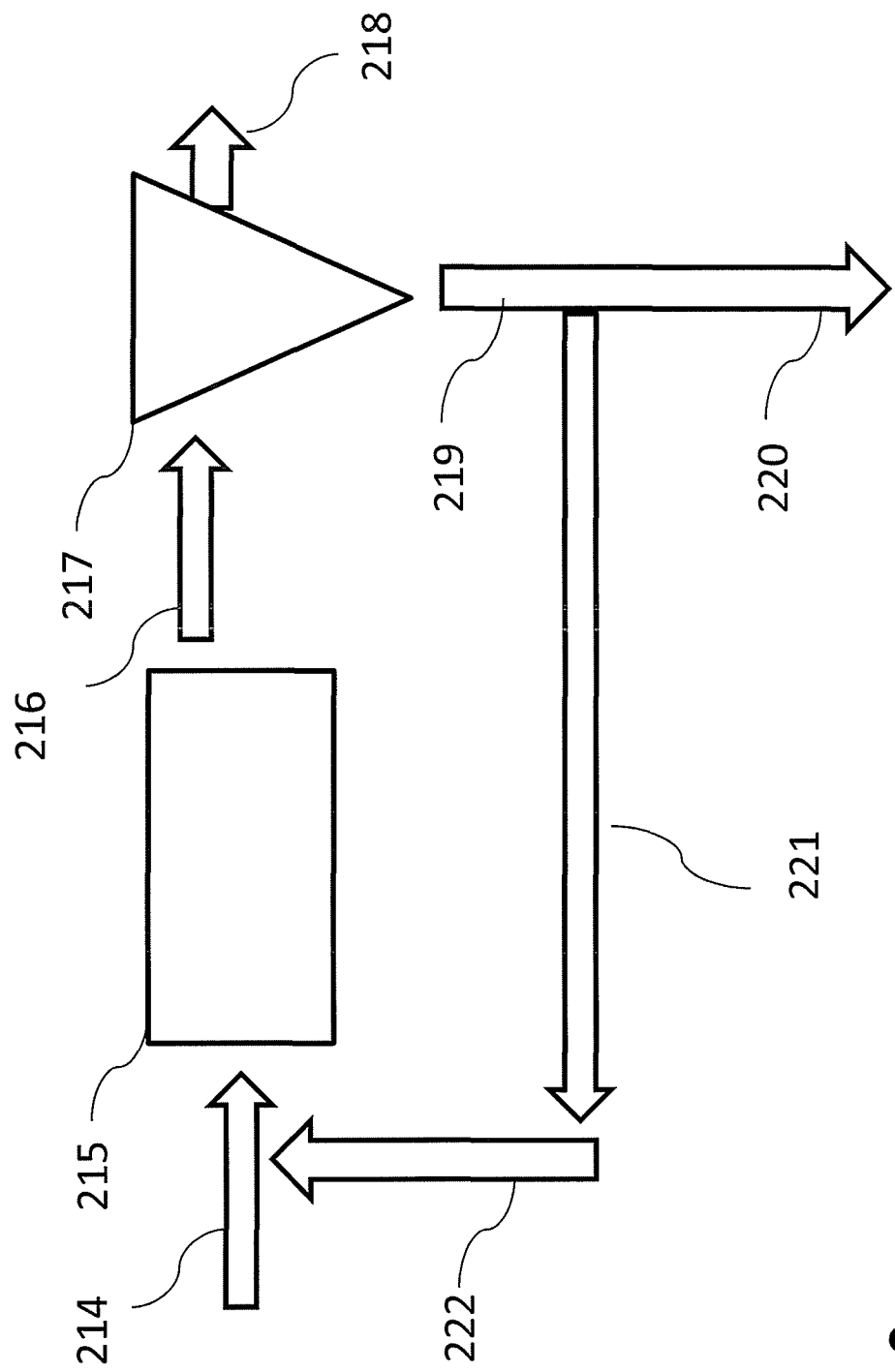
FIG. 2 is a flowchart showing a method for an activated sludge process in accordance with an example embodiment.

Description of Apparatus: The disclosed embodiments provide a physical apparatus such as a screen (any device in any shape and configuration that contains, or operates as if it were, a mesh of pore size as indicated below) along with associated tanks and equipment to select and retain particles (that includes organic material or organisms, etc.) in a wastewater treatment process such as an activated sludge system based on physical factors such as particle size, diffusion, coagulation, flocculation, filtration, shear, viscosity, gravimetry, floatation, or compressibility. The size of the particles retained depends on the size of the screen mesh, in the 10-10,000 micron size range (more preferably in the range of from 10 to 5,000 microns). Larger sized granules can be retained along with smaller sized flocs or granules based on mesh size. The use of a filter mat on the screen can retain smaller particles less than micron size and could even approach the colloidal range. In addition to size retention, the ability to selectively retain compressible or non-compressible material depends on the washing volume or velocity, vacuum applied or the force applied perpendicularly. The shearing of the material depends on the amount of tangential stress applied. The more compressible material tends to pass through the screen as it is washed, and the screen will abrade the particles when shear forces are applied. Depending on the applied shear intensity and duration or frequency either flocculation and agglomeration is promoted or on the other hand, the surface of aggregates gets shaved off, the overall particle size gets reduced and particles of low shear resistance tend to get broken apart and washed out. Shear forces can be managed to provide for orthokinetic flocculation (agglomeration of particles) at low shear intensities of 0 to approximately 100-200 s$^{-1}$ and for flocculation times of 0 to approximately 15 minutes, or to break-up particles at high shear intensities well in excess of approximately 100-200 s$^{-1}$. While these approximate values of shear and time are provided, these values can change depending on fluid characteristics and therefore optimized shear and time outside of this range is certainly possible as long as this shear and time promotes net agglomeration or net breakup of particles, whichever is desired. At low shear intensities, only large particles that are flocculated are retained. On the other hand, the application of high shear force reduces the diffusion resistance of these larger aggregates and leads to smaller particles with larger active surfaces and/or promotes the formation of aggregates that confer shear resistance, production of extracellular polymeric substance to enhance flocculation, or resists breakup. This management of shear to optimize flocculation versus promoting particle breakup can be applied for specific selection and control using process instrumentation if so desired. Chemical coagulants and flocculants can be used as necessary to enhance the process if desired. The application of shear before a reactor (in an upstream section) or during reaction, can produce different physiological effects. Another feature of this disclosure is to provide an approach for coagulation and filtration of particles. A filter mat promoted by the screen can trap colloids and fines that support particle retention. The shear and/or filter mat produced can be adjusted by managing the vibration in a vibrating screen, the rotation speed in a drum screen, or using spray bars or a lance, or a similar approach for different types of screen, sieve or filter devices. The water level can also be adjusted as appropriate. In other variations the exposed shear rate or time, particle compression, or solid residence times ("SRT") can be adjusted manually and/or automatically in response to detected readings from an analytical instrument such as a spectrophotometer or other optical, hydraulic or mechanical approaches to optimize selection of organisms.

This approach shows how a single device such as a screen can promote selection based on multiple physical forces such as size, shear, coagulation, flocculation, filtration, etc. Similarly, other devices can be used to promote physical selection based on single or multiple physical forces.

The retained or non-retained material, or the accumulated mixed liquor from the associated tank associated with physical selection can be bioaugmented to another tank to increase the activity or reaction rates in the bioaugmented tank or system. The bioaugmentation can be conducted in a manner that for example, the swapping of retained or non-retained material from the two tanks can take place if needed.

The retained or non-retained material can be specifically exposed to an inhibitor or toxicant to reduce the rates of reaction of organisms that need to be out-selected or removed from the process. The exposure of the retained or non-retained material can be for example to reduce the rates of nitrite oxidizing organisms compared to ammonia oxidizing organisms using inhibitors or inhibitory conditions, such as free nitrous acid, thermal hydrolysis filtrate, incinerator blowdown wastes containing cyanides or other pollutants, etc.

The retained or non-retained material can be specifically exposed to stimulants (such as micronutrients) or otherwise conditions (such as warmer temperature or substrates) to increase the process rates of reaction or growth rates of organisms that need to be selected or enhanced. The exposure of the retained or non-retained material can be for example to increase the rates of ammonia oxidizing organisms compared to nitrite oxidizing organisms in a selection process.

FIGS. 1a-1c are three schematic views of one example embodiment of the screening apparatus 10. As shown in these figures, the screening apparatus 10 processes an entering wastewater stream 1 via an internal particle/solids separator 2 which screens waste constituents out to a waste stream 3 while separating the waste constituents from those constituents of the wastewater stream 1 that are to be retained 4. Wastewater 1 can be pre-screened prior to entering screening apparatus 10 in order to remove larger trash or granules that need to be excluded from the process. The use of the screen 2 increases the solids residence time of the screened constituents 4 and provides a selection pressure for larger biological particles, thus uncoupling the solids residence time of the screened constituents 4 from the solids residence time of the unscreened (pass through) constituents (waste stream 3). This uncoupling of solids residence time allows for additional reaction time for the screened constituents 4. The screening efficiency can be calibrated to increase or decrease the solids residence time of the screened constituents 4. An optional screen wash 5 using gas, liquid, vacuum, or some combination of matter can be added to further assist in the screening process. The screen wash 5 can be directed toward the screen 2 in a variety of different ways, which differently affect the solids residence time, including but not limited to, along the vertical axis (FIG. 1a), an angle directly perpendicular to the screen (FIG. 1b), or along the horizontal axis (FIG. 1c). In alternate embodiments the screen wash can be applied on the retained or pass through sides of the screen. Under certain conditions a portion (0-100%) of the waste constituents can also be recycled if needed to provide for additional reactions associated with the pass-through material.

Advantages may be achieved by employing a screen assembly that does not have a mesh-type screen device. Devices that may be used, if desired, in addition to or as an alternative to a mesh-type screen device include filter/sieve/membrane separation devices that select based on particle size, compression, or devices that separate based on shear, gravimetry, and/or diffusion.

In the below embodiments the primary separator is optional. Screen Apparatus in Activated Sludge Process: The screen of the disclosed embodiments can be used in an activated sludge system consisting of a bioreactor that is used for the treatment of wastewater, or other liquor such as from internal side streams. The bioreactor is connected to a separation device, which may include a clarifier, an upflow granular reactor, a membrane, a filter, a dissolved air floatation device, or any other separation device, for the recycling or removal of biomass. The separation can also occur based on a sequenced time interval in the bioreactor itself in any of the below embodiments. Optionally, the separation device can be sequenced as a bioreactor if needed in any of the below embodiments. FIG. 2 is a flowchart showing a method for a typical activated sludge process in accordance with an example embodiment. Wastewater stream 214 enters a bioreactor 215. After exiting the bioreactor 215, the wastewater stream 216 enters into a separator 217. The separator 217 can be, for example, a clarifier, an upflow granular reactor, a membrane, a filter, a screen, a cyclone, a centrifuge, or a dissolved air floatation device. While some wastewater passes through to effluent 218, the remaining wastewater 219 is thus separated from activated sludge, some of which is recycled (221) along a path 222 back directly to the reactor or to influent 214 to the bioreactor 215 in order to efficiently process more out of the system as the remaining excess sludge 220 exits the system. The activated sludge process can be divided into anaerobic and/or aerobic zones to promote feast and famine regimes. If so desired, the holding tank for the screen device (such as a separate reservoir or wet well, or a drum for a rotary drum screen), or screen devices, can itself serve as an anaerobic zone and receive influent wastewater to promote storage of soluble substrates such as poly-hydroxy alkanoates, glycogen or any other form of polymeric on non-polymeric storage material.

Figure 3:
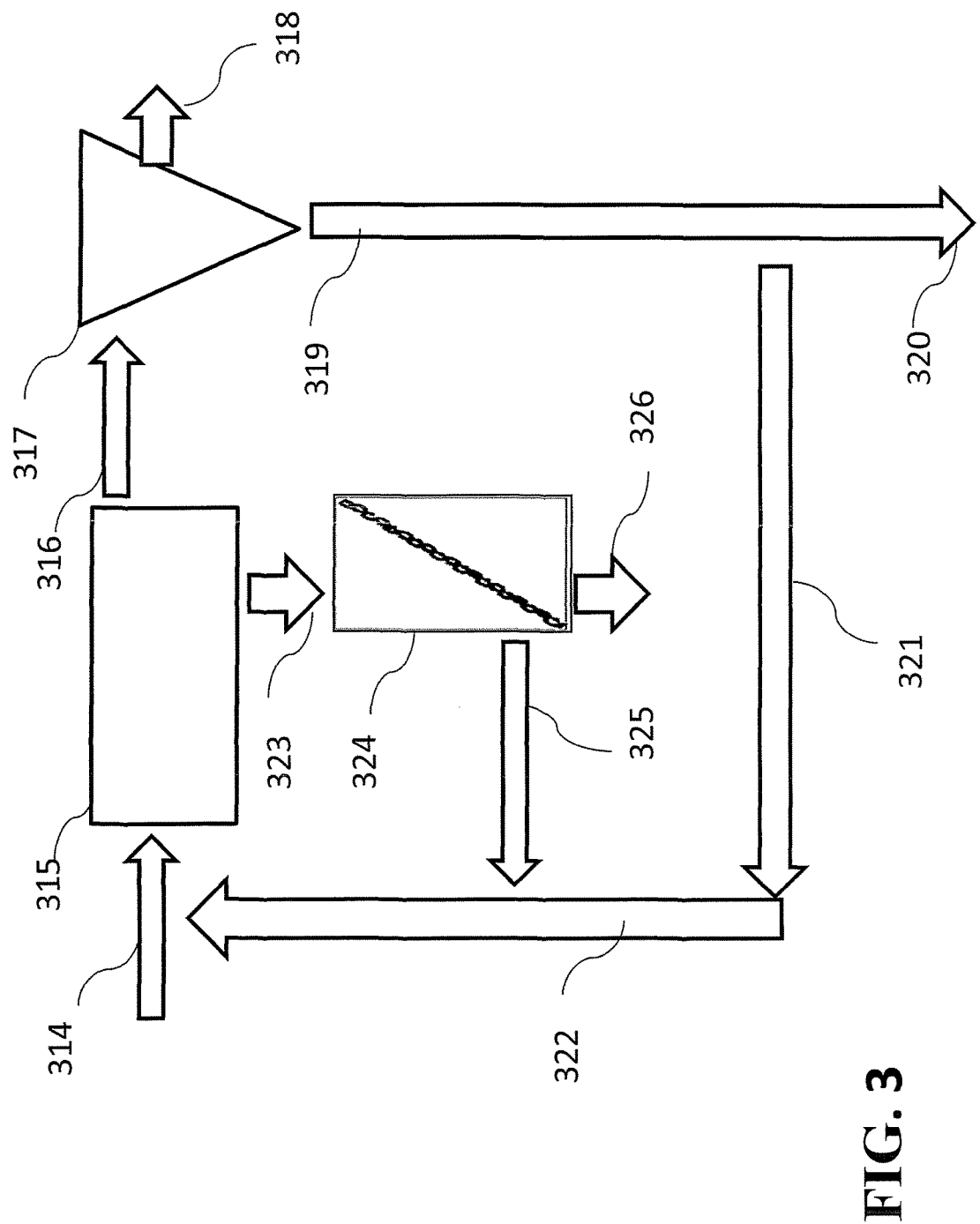
FIG. 3 is a flowchart showing another method for an activated sludge process in accordance with an example embodiment.

FIG. 3 is a flowchart showing another method for an activated sludge process in accordance with an example embodiment. The embodiment of FIG. 3 is similar to that of FIG. 2 (like elements are labeled the same [only with a preceding 3 in lieu of a 2] and need not be described again), but includes an additional path 323 from the bioreactor 315 for mixed liquor which is processed by a screening apparatus 324 before being separated into a retained effluent stream 325 to be recycled into the system and a pass through stream 326 to exit the system. Some or all of the pass-through stream 326 can also be recycled if needed. Some of the effluent stream 325 may be wasted (not shown). The amount of the streams 325 and 326 that is wasted or recycled may be adjustably controlled to control the solids residence time of the material that is retained or wasted by the screening apparatus 324. The screening apparatus 324 can be integrated into the bioreactor 315 in a sequencing batch arrangement or can be separate from bioreactor 315 as shown in FIG. 3. The separation could occur through any previously mentioned separation method including gravity or flotation. The solids residence time for the system depends on the amount of excess sludge that is removed continuously or periodically from the separation device, which may be similar to that shown in FIGS. 1a-1c. An increase in excess sludge removal decreases the solids residence time of the two fractions and vice-versa.

Figure 4:
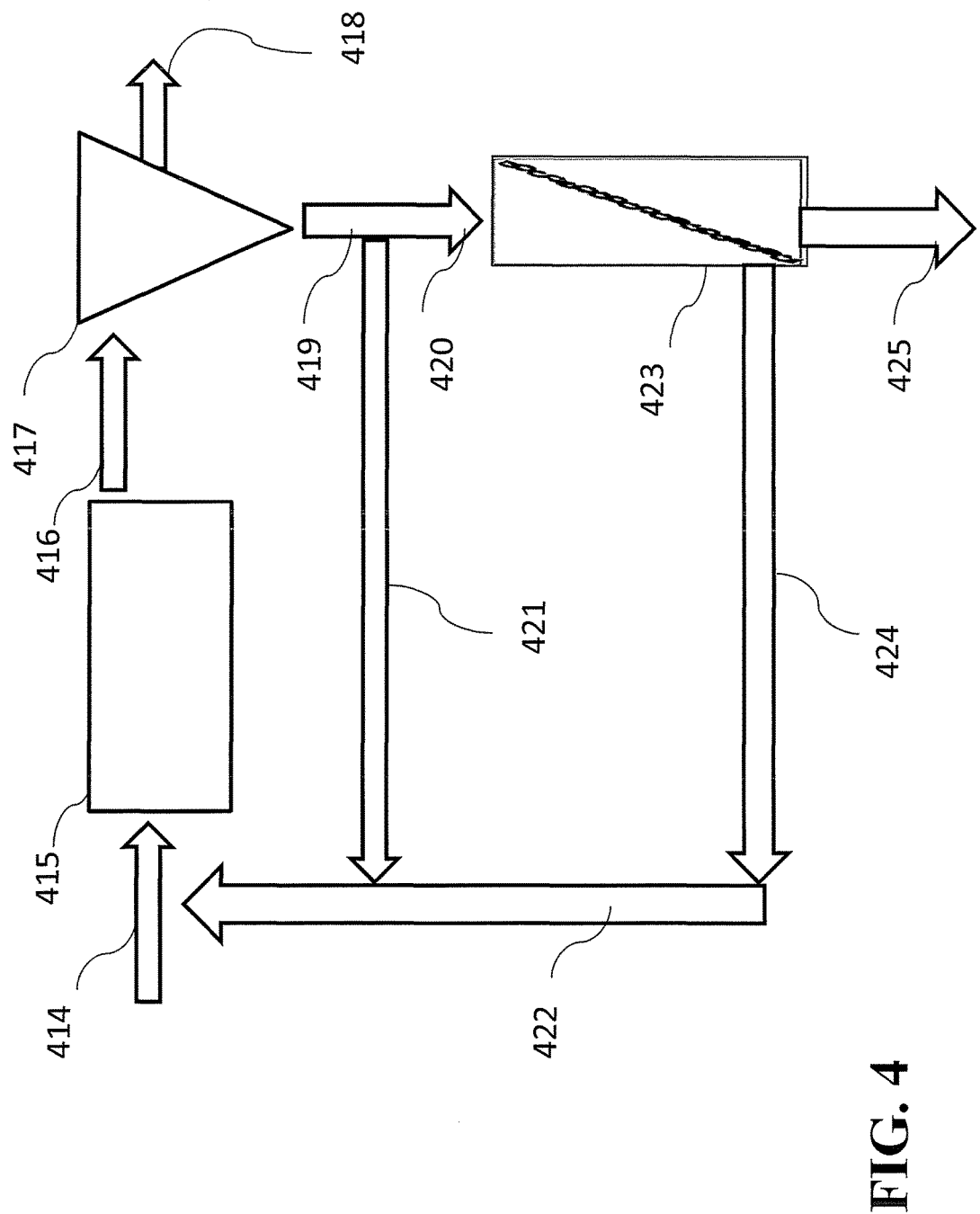
FIG. 4 is a flowchart showing another method for an activated sludge process in accordance with an example embodiment.

FIG. 4 is a flowchart showing another method for an activated sludge process in accordance with an example embodiment. As seen in FIG. 4, screen device 423 can be provided (either in parallel or in series with the biomass settlement/floatation device) in line with the excess sludge 420 withdrawal system, instead of as an additional path from the bioreactor 415 (as shown in FIG. 3). The excess sludge removal can occur directly from a separator 417 following the bioreactor 415. In this case the screen can be located at this alternate excess sludge 420 withdrawal system from the bioreactor. As with the apparatus illustrated in FIG. 3, some of the effluent stream 424 from the screening apparatus 423 may be wasted (not shown). The amount of the effluent stream 424 that is wasted in the FIG. 4 apparatus may be adjustably controlled to control the solids residence time of the material that is retained by the screening apparatus 423. Other conditions of FIG. 3 can be replicated in FIG. 4.

The below embodiments show a drum screen being used to separate retained from pass through effluent, however other screening, filtration or sieving approaches including but not limited to vibrating screens, longitudinal/transverse rake screens, or vertical/horizontal/angled screens/filters may be used within the spirit of the invention.

Figure 5:
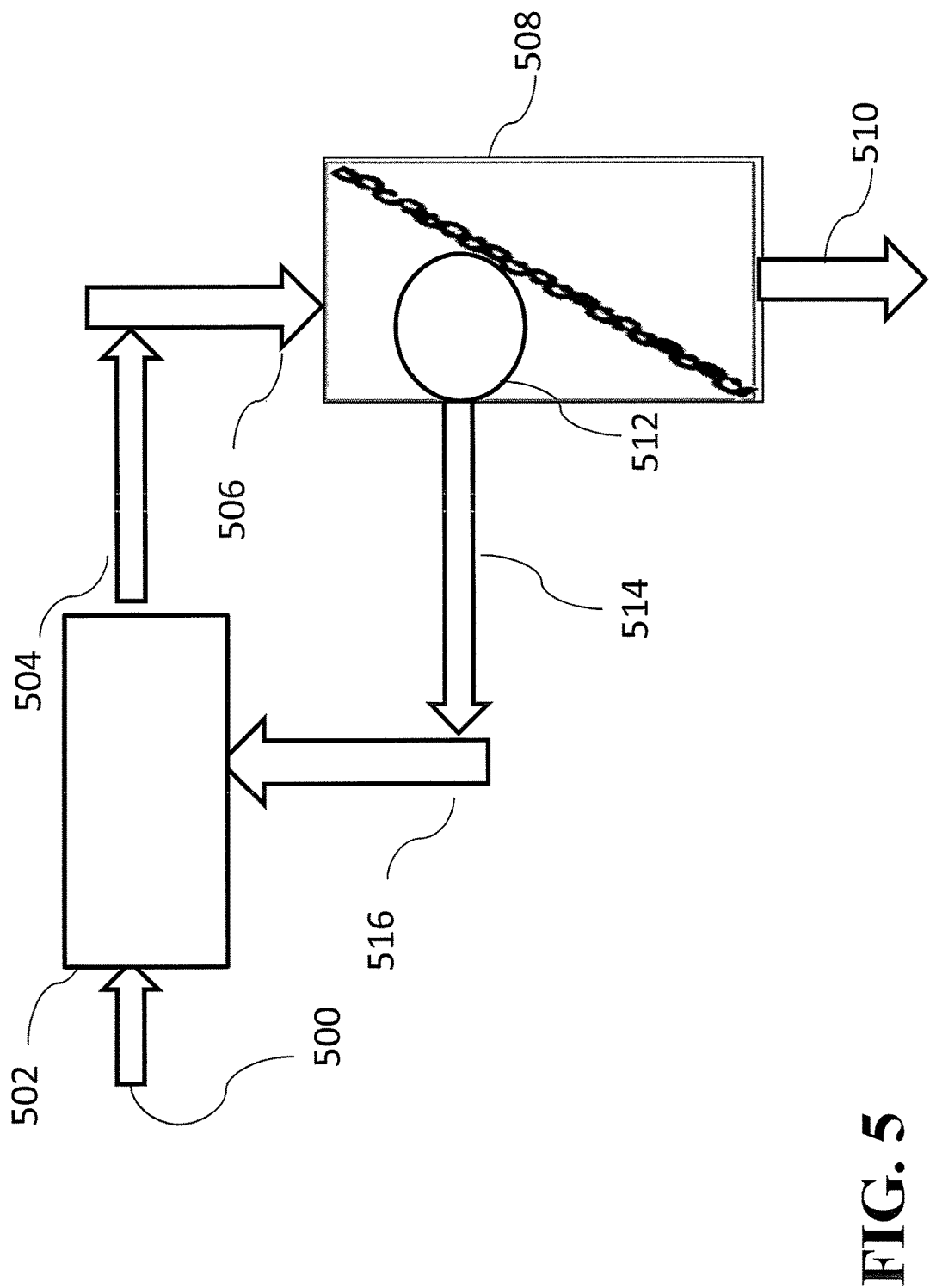
FIG. 5 is a flowchart showing another method for an activated sludge process in accordance with an example embodiment, wherein the rotating speed of the example drum screen is used to control filter mat built-up and solids retainment.

FIG. 5 shows influent flow 500 sent to a tank 502. Mixed liquor 504 exits the tank 502, traveling along a path 506, to a screen assembly 508, before at least a portion of the screened mixed liquor is discharged as effluent flow including waste biomass 510. No other discharge unit is required. The screen assembly 508 further comprises a drum 512. The rotating speed of the drum 512 is used to control a filter mat buildup or the solids retained. Selected retained solids 514 are returned along a path 516 to the tank 502. The waste can occur in either the pass through effluent 510 or retained solids 514. For example, the retained solids 514 can consist of anammox organisms and pass through solids can contain aerobic ammonia oxidizing organisms or nitrite oxidizing organisms.

Figure 6:
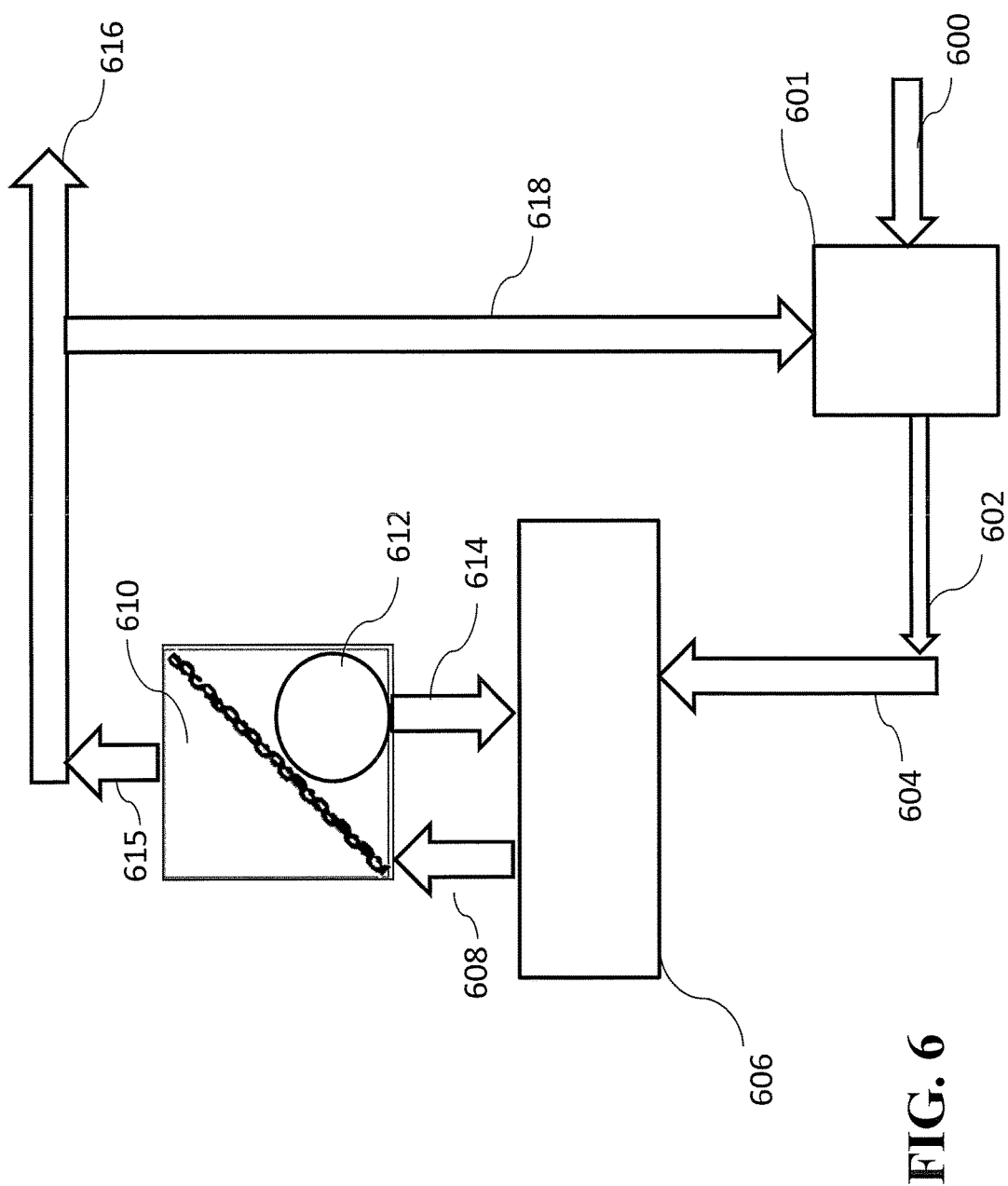
FIG. 6 is a flowchart showing another method for an activated sludge process in accordance with an example embodiment, wherein mixed liquor is fed to the example drum-screen, effluent filtrate is discharged or can be recycled to an upstream tank and selected retained solids are returned to the reactor.

FIG. 6 shows influent 600 to a feed tank 601 which sends its effluent flow 602 along a path 604 to a reactor 606. The reactor 606 sends mixed liquor 608 to a screen assembly 610, which includes a drum-sieve (or drum screen) 612. The drum-sieve 612 separates and returns retained solids 614 to the reactor 606, as the screen assembly 610 discharges a portion of effluent flow including waste biomass 616 as a part of the optional waste or optional effluent, which can then be optionally recycled 618 to the feed tank 600. For example, the retained solids 614 can consist of, or include, anammox organisms and can be periodically wasted to maintain optimum solids residence time of the reactor 606. The effluent or waste 615 may pass through 616 or can be recycled 618 to the feed tank 600 for predenitrification using substrates in the influent and nitrate or nitrite in the effluent. No discharge unit is required other than from 616 in the screen assembly 610.

Figure 7:
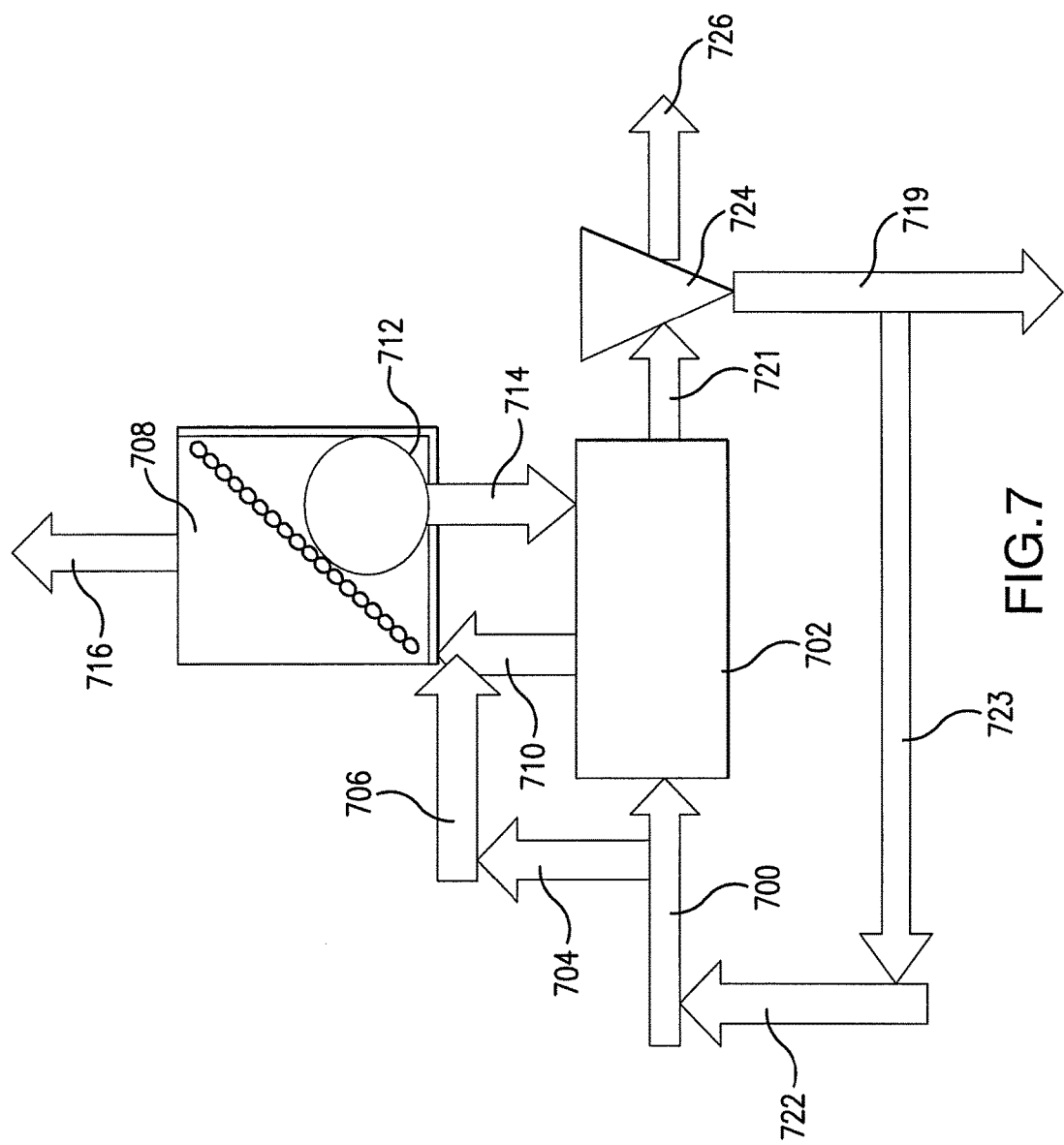
FIG. 7 is a flowchart showing another method for an activated sludge process in accordance with an example embodiment, wherein the rotating speed of an example drum screen apparatus is used to control the solids retained.

An example of such an embodiment is also illustrated in FIG. 7. As seen in FIG. 7, an influent 700 optionally flows into a tank 702. The influent 700 may also optionally flow along paths 704, 706 to enter a screen apparatus 708. The screen apparatus 708 may also optionally receive mixed liquor 710 of the tank 702. The tank 702 may send effluent 721 to a clarifier 724, which sends effluent flow 726 out of the clarifier 724. The screen apparatus 708 further comprises a drum apparatus 712 which optionally sends a recycled stream 714, containing selected retained solids, to the tank 702. Some of the retained stream 714 can be wasted to allow for SRT control. The rotating speed of the drum apparatus 712 (e.g., a drum screen) can be used to control the solids retained. In addition to the recycled stream 714, waste biomass pass through 716 may exit the screen 708, with some of it optionally being recycled to tank 702 to control the SRT of the pass-through fraction. Part or the entire influent 700 is fed (704, 706) to the screen 708 directly or via a contactor and or flocculation/shear tank to allow for storage, sorption, flocculation, floc shear, or filtration of influent or mixed liquor material prior to being returned to the tank and/or being wasted in either the pass through or retained fraction. The solids-liquid separator has an optional waste stream 719 and a recycle stream 723, 722 that returns underflow to the reactor 702 or to the screen 708.

Figure 8:
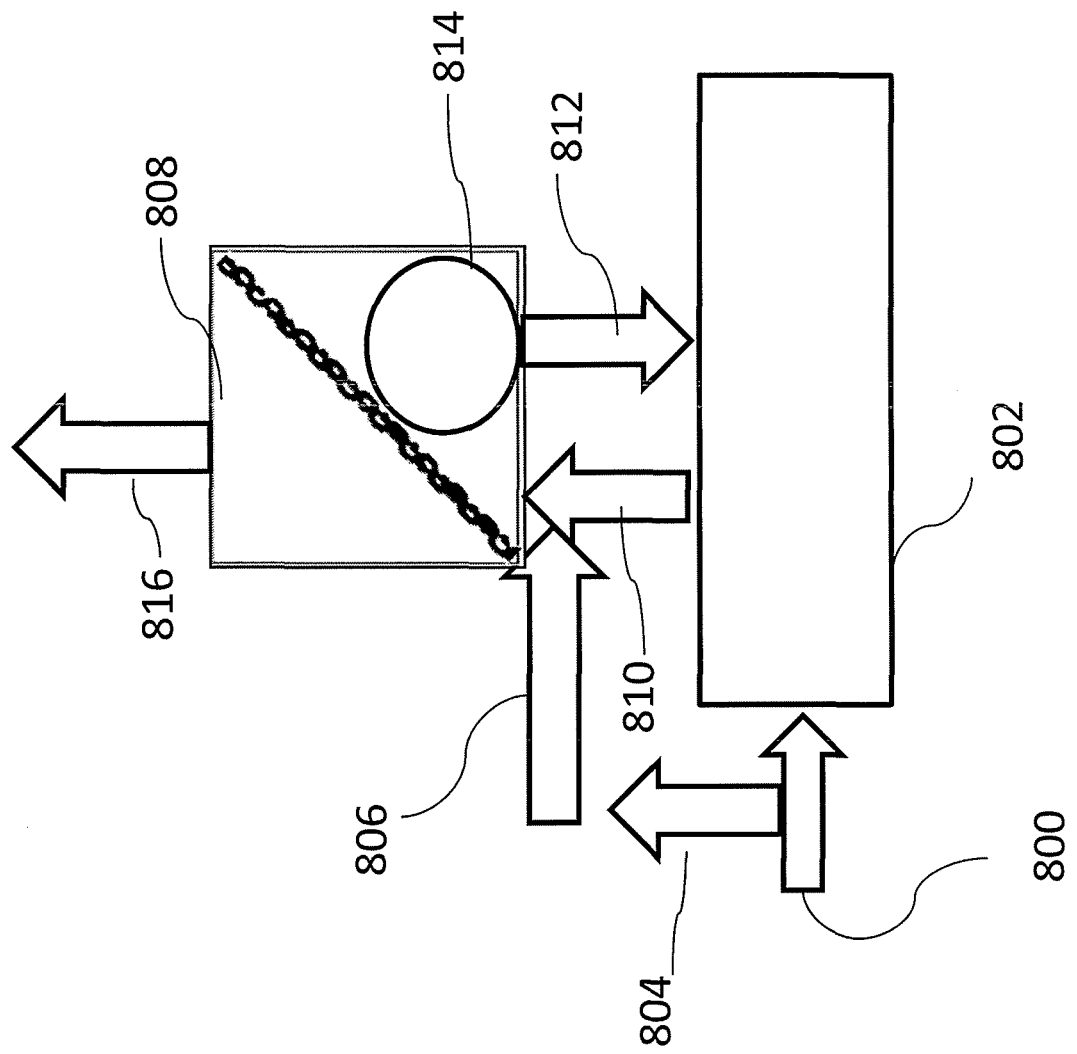
FIG. 8 is a flowchart that shows an alternative option of FIG. 5, wherein the screen performs as a contactor and/or flocculator.

As shown in FIG. 8, an influent 800 may be fed optionally to a reactor tank 802, or optionally along paths 804, 806 to a screen apparatus 808. The screen apparatus 808 can consist of an upstream reservoir/wet well (single or multiple series or parallel units) in addition to drum 814. The screen/reservoir performs as a contactor and/or flocculator/shear tank and creates conditions to store and flocculate (or shear) optionally influent material or optionally mixed liquor. The waste is optionally either the retained 812 or the effluent pass through fraction 816. The retained fraction 812 may be recycled to the reservoir 802. The reactor tank 802 may also function as a stabilizer tank discharging mixed liquor 810 to the screen sieve apparatus 808. Shear can be applied in the reactor by using mixing energy or turbulent air.

Figure 9:
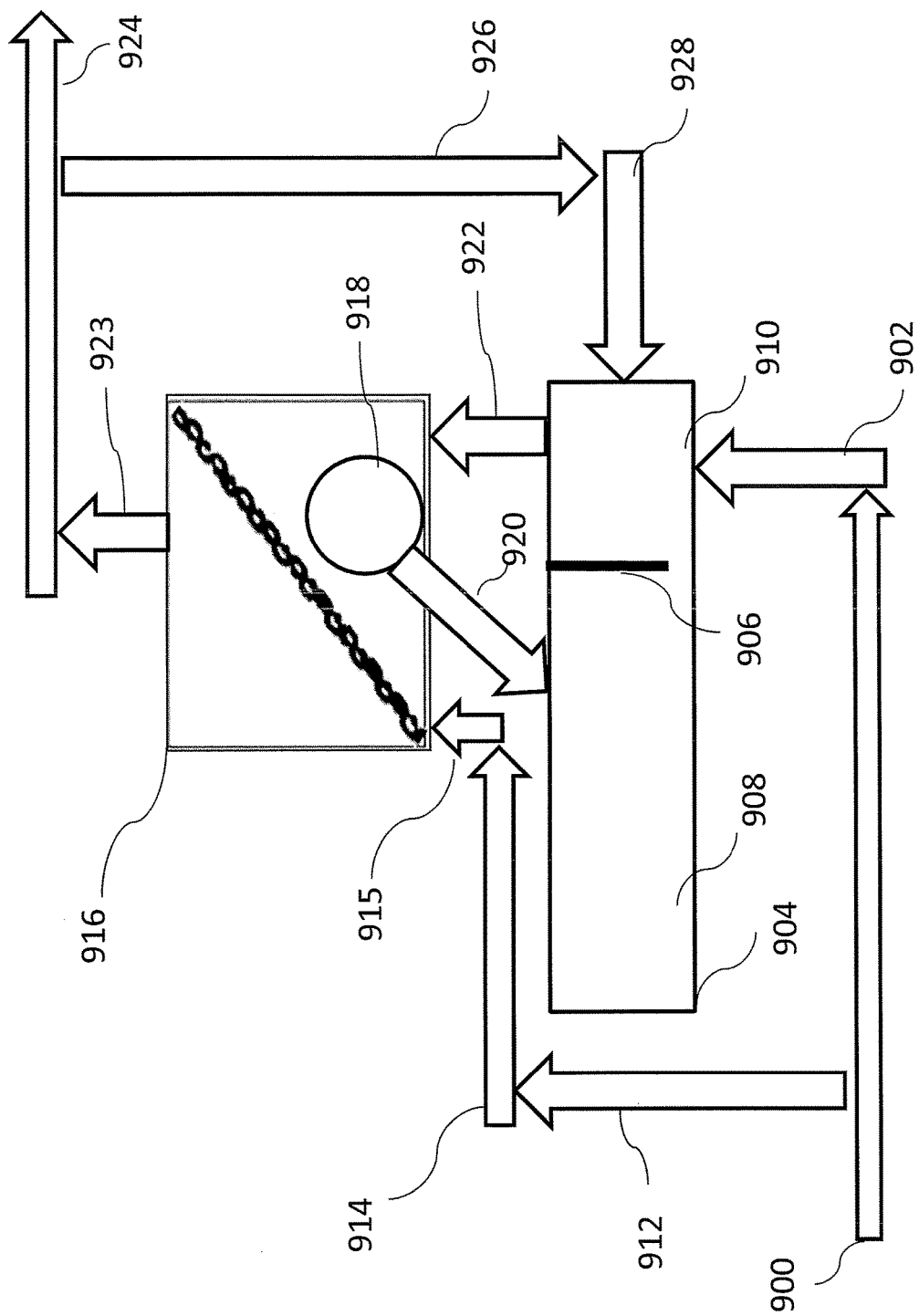
FIG. 9 is a flowchart showing another method for an activated sludge process in accordance with an example embodiment, which includes a tank having an aerobic section and an anaerobic section.

FIG. 9 shows a modification of the FIG. 8 system, where the influent 900 is sent along a path 902 to a tank 904 containing a wall with a gap 906, which separates an aerobic section 908 from a dedicated anaerobic section 910. Influent 900 may also be sent optionally along paths 912, 914, 915 and enter a screen assembly 916. The screen assembly 916 includes a drum sieve or a drum screen 918, which returns a portion of retained solids 920 to the aerobic section 908 of the tank 904. The influent 900 sent to the anaerobic section 910 may be sent as mixed liquor 922 to the screen assembly 916. The effluent 924 is the pass-through fraction from the screen assembly 916. The waste is either the retained fraction 920 or a pass through fraction 923, 924. Some of the pass through can be returned (926, 928) to either the anaerobic or aerobic sections. The effluent 924 may exit the system or be recycled 926 to the anaerobic section 910 via a path 928. By recycling the effluent, which contains nitrate ($NO_x$), more organics can be removed from the influent 900 in a separate holding tank or integrated within the reactor.

In the embodiment of FIG. 9, the wall 906 physically separates an aerobic section 908 and an anaerobic section 910. However, if desired, the aerobic and anaerobic sections may be located in the same physical space but separated from each in time by batch or sequence processing. The tank 904 may have, for example, a source of air and/or oxygen that may be on/off controlled to switch the contents of the tank 904 between aerobic and anaerobic conditions. In general, where desired, multiple processes described herein may be performed by common systems according to batch or sequence processing.

In general, the tank 904 (and the other tanks described herein) may be configured for anaerobic and aerobic processing, or to create conditions for differential diffusion of a substrate, or to create conditions for differential oxidation-reduction, in space or time, that promote storage, or allows for plug flow conditions, or feast and famine regimes.

According to another embodiment, an influent flow 1000 (FIG. 10) is sent to a tank 1002. The flow 1000 from tank 1002 may pass through (1009) to a clarifier 1010, which sends a portion of the mixed liquor 1009 as effluent 1011 and the remainder 1024 along return paths 1026, 1028, and ultimately recombines with the influent 1000 or directly to tank 1002. A portion of the remainder 1024 may be optionally wasted if needed, where the pass through is the effluent 1030 and the retained fraction 1020 is either returned directly to the tank 1002 or optionally wasted (1032). The combination of a hydraulically limited solid-liquid separator and solids limited screen provides optimal removals under both high solids loading and high hydraulic loading (storm flow) conditions.

Figure 10:
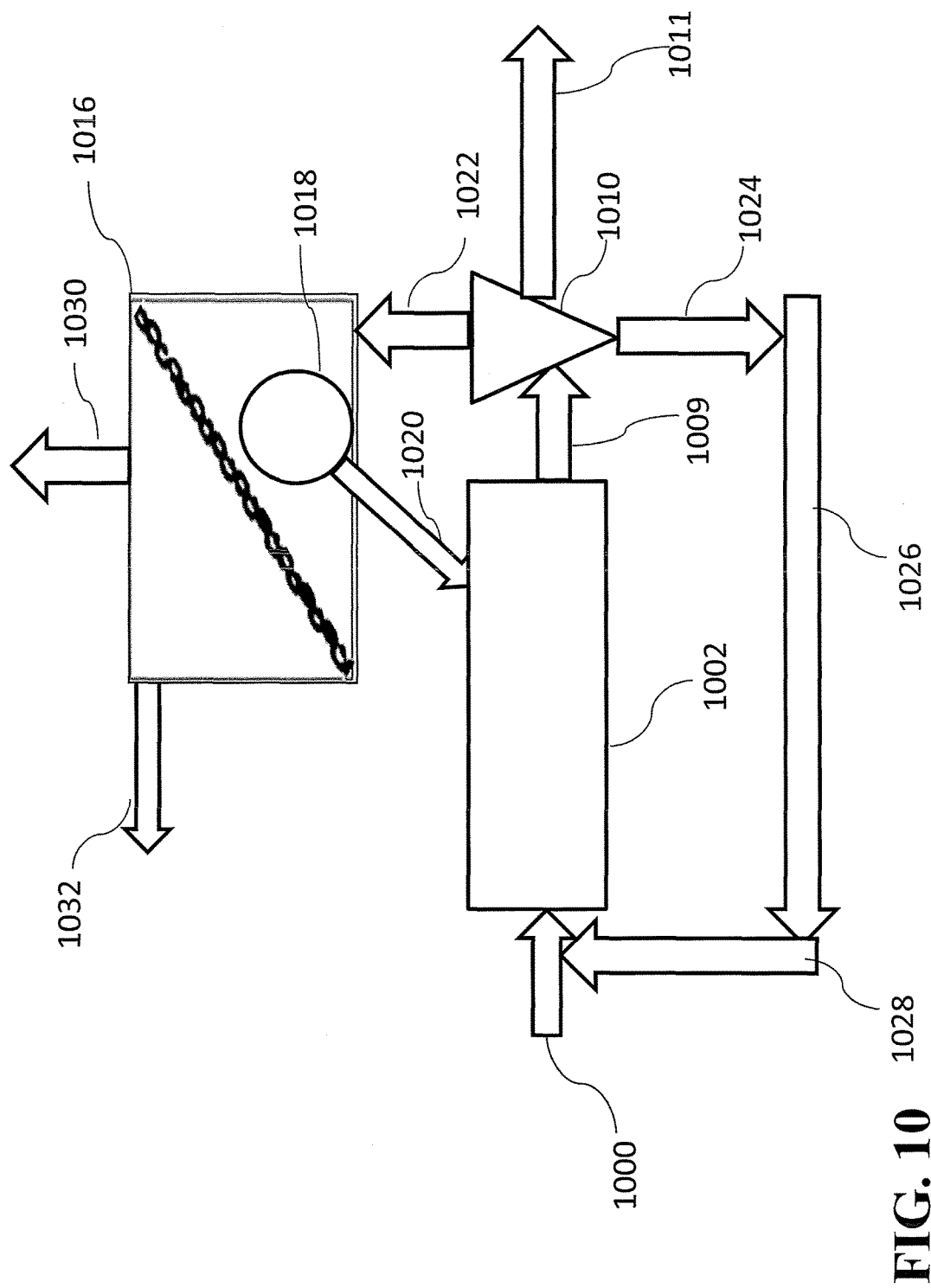
FIG. 10 is a flowchart showing another method for an activated sludge process in accordance with an example embodiment, wherein presettled liquor with TSS<MLSS is optionally fed to the drum-sieve, effluent filtrate is discharged (no other discharge unit required) from screen and selected retained solids are returned to the reactor.

In the system of FIG. 10, effluent (1011) from clarifier 1010 is optional. Under certain conditions, it may be advantageous to operate the system of FIG. 10 without discharging any effluent from the clarifier 1010.

According to another embodiment of the present disclosure, an influent flow 1100 (FIG. 11) is fed directly to a screen assembly 1102 or optionally 1101 to a reactor 1110. In this embodiment, the screen assembly 1102 optionally performs as an integrated anaerobic zone. The screen assembly 1102 can also optionally participate in coagulation, flocculation or shear with or without chemicals, and may optionally discharge effluent 1103 and may also further include a drum-sieve 1104 which optionally sends a portion of waste biomass as effluent 1106 out of the system and optionally recycles another portion 1108 to a reservoir/tank 1110. The reactor/tank 1110 may send effluent 1119 to a clarifier 1120 which may further discharge effluent 1121. The reactor/tank/separator 1110, 1120 sends return flow 1122 along paths 1124, 1126 returning the flow 1122 to the screen assembly 1102 or optionally to tank 1110. Flow can be optionally wasted out of 1122. When a reservoir/tank for the screen assembly 1102 is maintained under anaerobic conditions, it can support conditions for storage of substrate that in some cases can be conducive for biological phosphorus removal. An anaerobic condition may, if desired, be maintained in a wet well associated with the screen assembly 1102. Moreover, an anaerobic condition may be maintained on one side of a drum sieve associated with the screen assembly 1102. The anaerobic conditions can be afforded to the screen influent, retained fraction, or pass through fraction. When the retained fraction is under anaerobic conditions and exposed to influent, feast conditions can be produced for uptake and storage of substrate in large granules or aggregates. Alternatively, the screen assembly 1102 can be used for pre-flocculation of influent material. Alternatively, the screen can be located in the downstream aerobic zone and can perform in lieu of or in addition to a solid-liquid separator with associated waste, effluent and recycles. Shear can be applied in the reactor or tank by using mixing energy or turbulent air.

Figure 11:
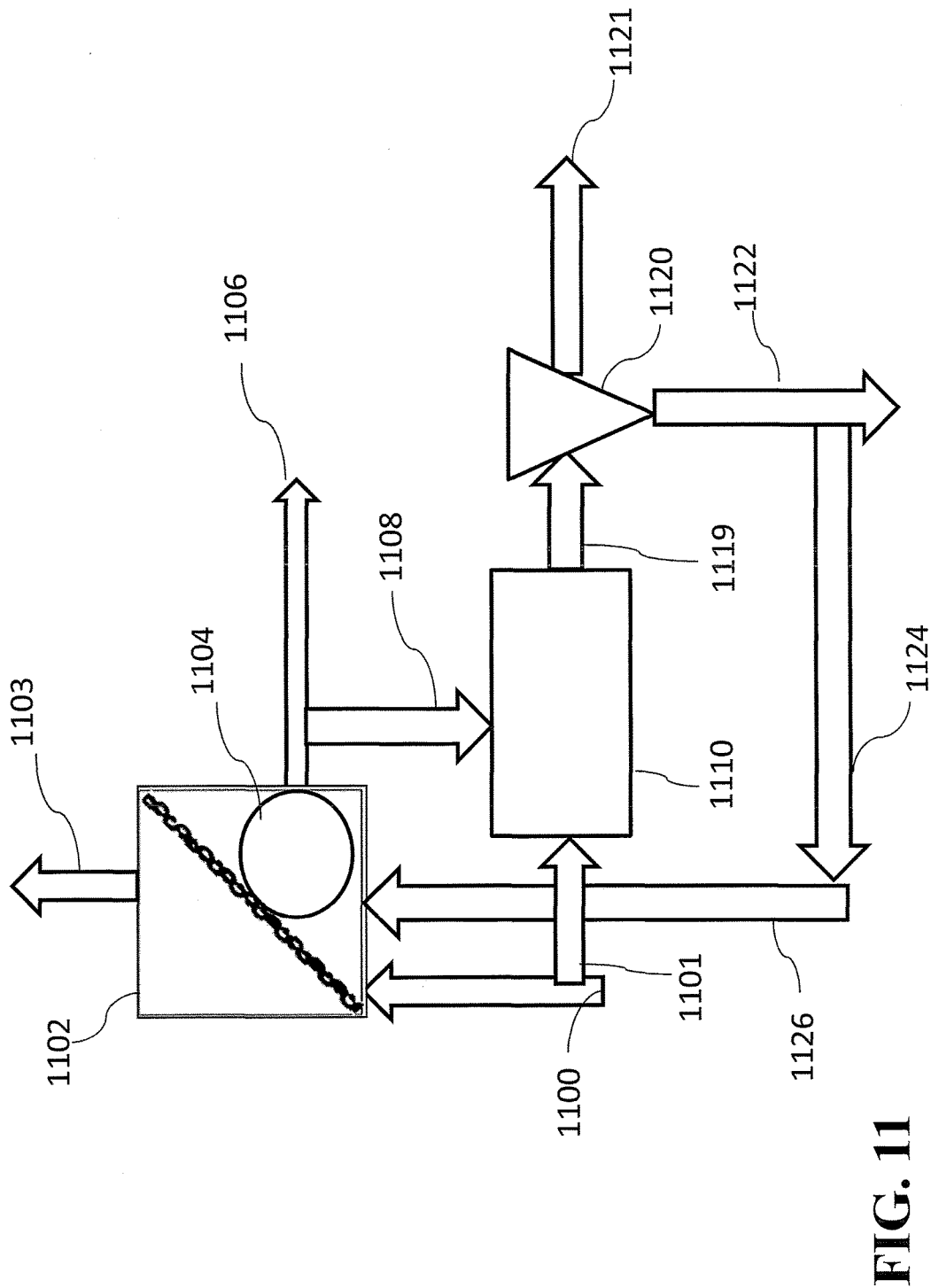
FIG. 11 shows another method for an activated sludge process in accordance with an example embodiment, wherein an influent flow is fed directly into a screen.

According to another embodiment of the present disclosure, which is a modification of the FIG. 11 system, an influent flow 1200 (FIG. 12) is optionally fed through 1211 to reactor or directly to a screen assembly 1202 associated optionally with either aerobic or anaerobic zones which discharges effluent 1203 and may further comprise a drum-sieve 1204 which sends a portion of the screened influent out of the screen assembly 1202 as effluent 1206, the effluent 1206 including waste biomass, and sends a portion of the screened influent 1208 to optionally an anaerobic section 1212 or optionally aerobic section 1216 (not shown) of a reservoir/tank 1210. The anaerobic section 1212 is separated by a wall (or a separator) with a gap 1214 from an aerobic section 1216 of the reservoir/tank 1210, which may further discharge effluent 1221 to a clarifier 1222, which may be discharged as effluent flow 1224 or recycled or wasted solids (1226). Recycled flow 1226 travels along paths 1228, 1230 back to the screen assembly 1202 or directly to reactor (not shown). Alternatively, the screen can be located in the downstream aerobic zone (not shown) and can perform in lieu of or in addition to a solid-liquid separator with associated waste (from retained or pass through), effluent and recycles by receiving mixed liquor from the aerobic section 1216.

Figure 12:
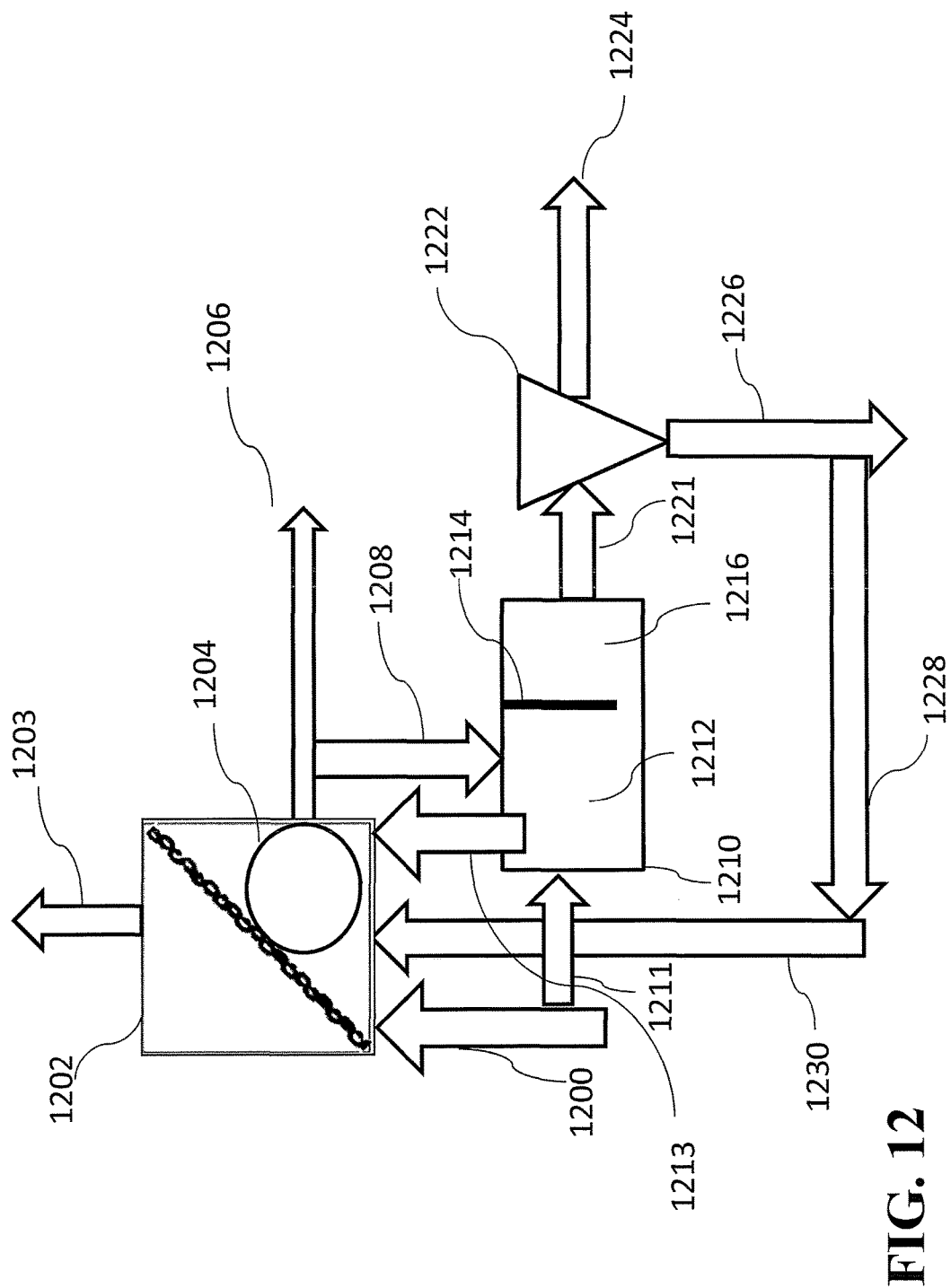
FIG. 12 is a flowchart showing a modification of FIG. 11, wherein an additional dedicated anaerobic zone is provided for additional storage of influent substrate.

In the embodiment of FIG. 12, the wall 1214 physically separates an aerobic section 1216 and an anaerobic section 1212. However, if desired, the aerobic and anaerobic sections may be located in the same physical space but separated from each in time by batch or sequence processing. The tank 1210 may have, for example, a source of air and/or oxygen that may be on/off controlled to switch the contents of the tank 1210 between aerobic and anaerobic conditions with flow 1213 optionally sent to screens in aerobic or anaerobic modes. In general, where desired, multiple processes described herein may be performed by common systems according to batch or sequence processing or with multiple screens thereof. Flow 1200 either optionally enters screen assembly 1202 and/or through flow 1211 enters the reactor 1210. The return sludge 1226 can be optionally partly wasted or recycled to screen assembly 1202 or to tank 1210 via flow 1228 and 1230. The separator 1222 receives flow 1221 from reactor and discharges 11224 as effluent.

Figure 13:
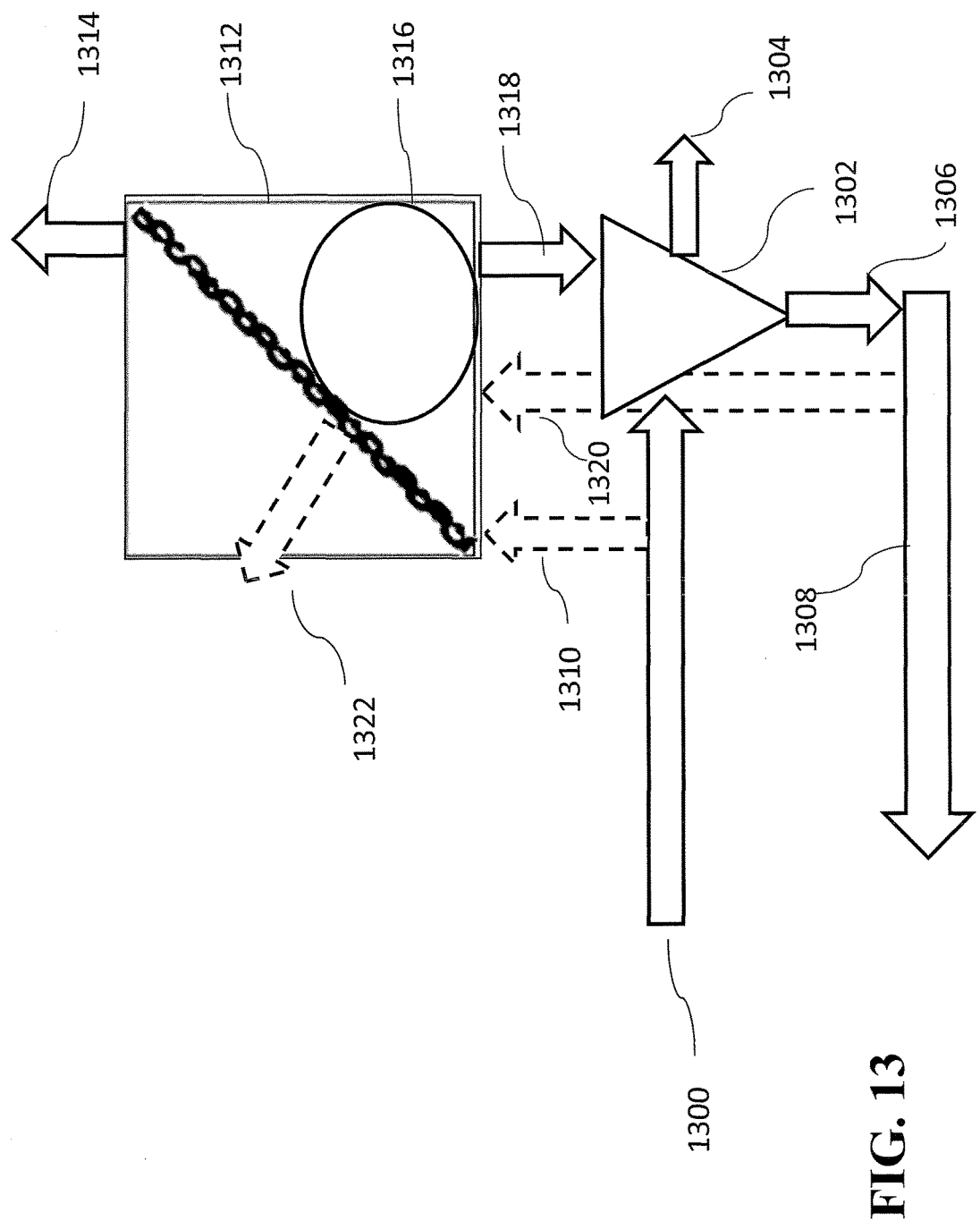
FIG. 13 is a flowchart showing another method in accordance with an example embodiment, wherein a screen that can be used in replacement or in addition to a weir of a solids-liquid separator that for example can be a primary clarifier, secondary clarifier or tertiary clarifier with the possibility of returning some solids to an upstream location as a seed for additional coagulation, flocculation, sorption, storage or biodegradation; or returned to the solids-liquid separator, as desired.

As seen in FIG. 13, influent wastewater, presettled solids (from a clarifier) or centrate/filter solids from dewatering units (such as a belt filter press, screw/rotary press, or other presses or centrifuges) are fed as influent 1300 to a clarifier/dewatering unit 1302, or the influent 1300 may travel entirely along a path 1310 to enter a screen assembly 1312 with a pass through effluent 1314. The screen assembly 1312 can have an upstream reservoir/wet well (single or multiple series or parallel units). Presettling allows for easier control of SRT of small particle fraction to be higher than hydraulic retention time. Waste biomass from the screen assembly 1312 is optionally generated in the retained fraction 1318 or discharged in effluents 1322 and/or 1314. The retained fraction 1318 is returned to the clarifier 1302. The clarifier may be operated to generate mixed liquor in a separate or same tank using air piping. The underflow may be sent from the clarifier 1302 along a path as waste biomass 1308 but may alternately be sent to the screen assembly 1320 as a contactor in some embodiments. Finally, in some embodiments influent 1300 may traverse a path 1310 to the screen assembly 1312. This is an example of a screen that can be used in replacement or in addition to a weir of a solids liquid separator that for example can be a primary clarifier, secondary clarifier or tertiary clarifier with the possibility of returning some solids to an upstream location as a seed for additional coagulation, flocculation, shear, sorption, storage or biodegradation; or returned to the solids-liquid separator, as desired. The screen assembly 1312 can be installed at the influent of the separator, middle of the separator or at the effluent of the separator. The solids-liquid separator can also be a dewatering unit such as a filter press or centrifuge, where the pass through filtrate is partly recycled for additional flocculation or shear along with incoming influent. Biological reactions can also be promoted in the solid-liquid separator itself, such as in sequencing mode if desired.

Figure 14:
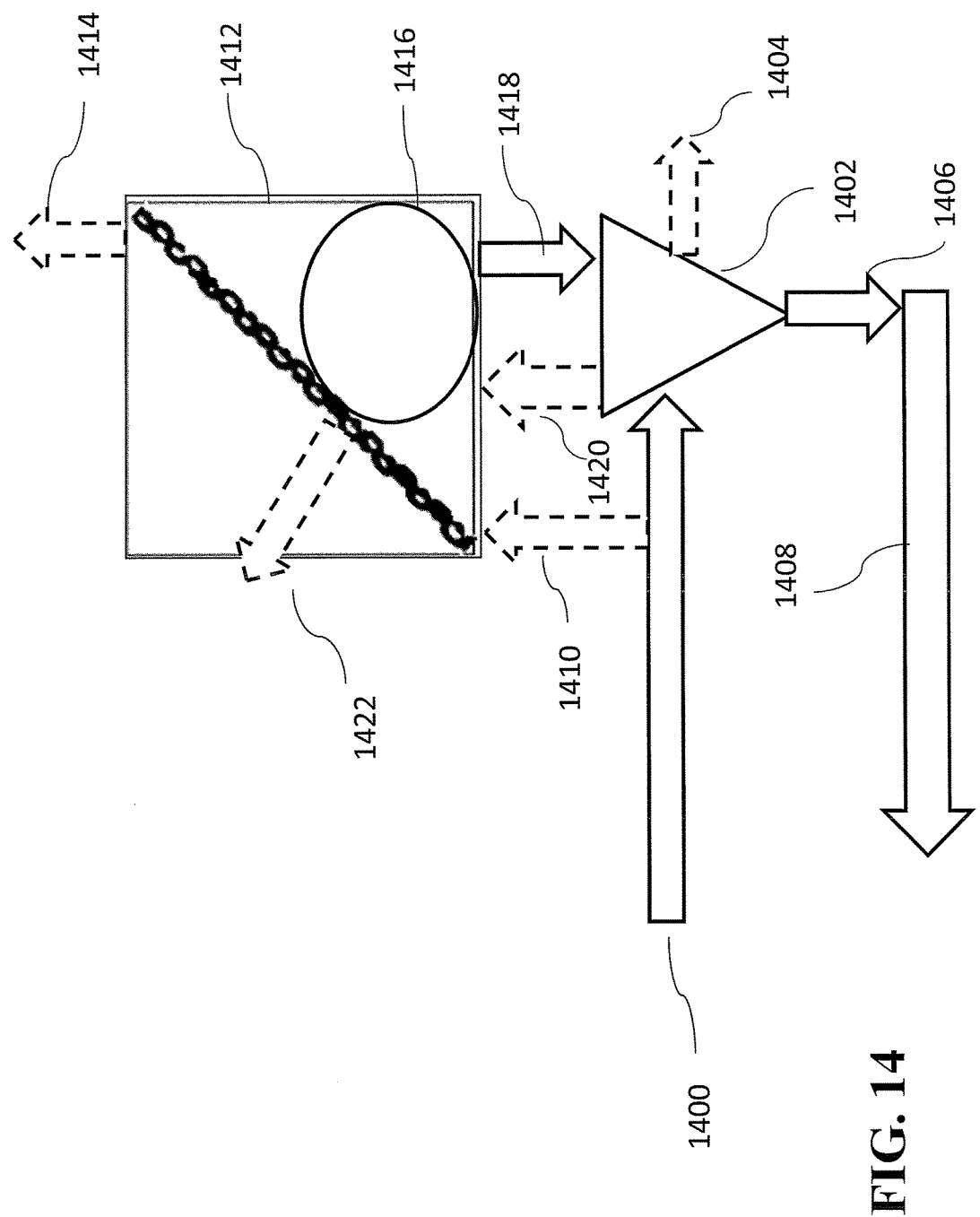
FIG. 14 shows another method for a solid-liquid separation process in accordance with an example embodiment, wherein a screen is used to improve flocculation of influent solids prior to settling in the solids-liquid separator.

Yet another embodiment of the present disclosure is revealed by the flowchart in FIG. 14. Here, the system is identical to that of FIG. 13 besides one exception. The exception here is that instead of waste biomass 1308 being alternately sent to the screen assembly 1312, a portion of the supernatant of the clarifier 1402 may be sent (1420) to the screen assembly 1412. This is an example of a screen assembly 1412 that can be used to improve flocculation optionally of influent or reacted solids prior to settling in the solids-liquid separator or optionally of the supernatant solids prior to discharge. Flow from the influent 1400 may be sent along a path 1410 to the screen assembly 1412 to help promote flocculation or floc breakup with shear, whichever is desired. Polymers may be added to the screen assembly 1412 to improve flocculation and/or coagulation. Other aspects of the embodiments in FIG. 13 are the same in the system of FIG. 14.

Figure 15:
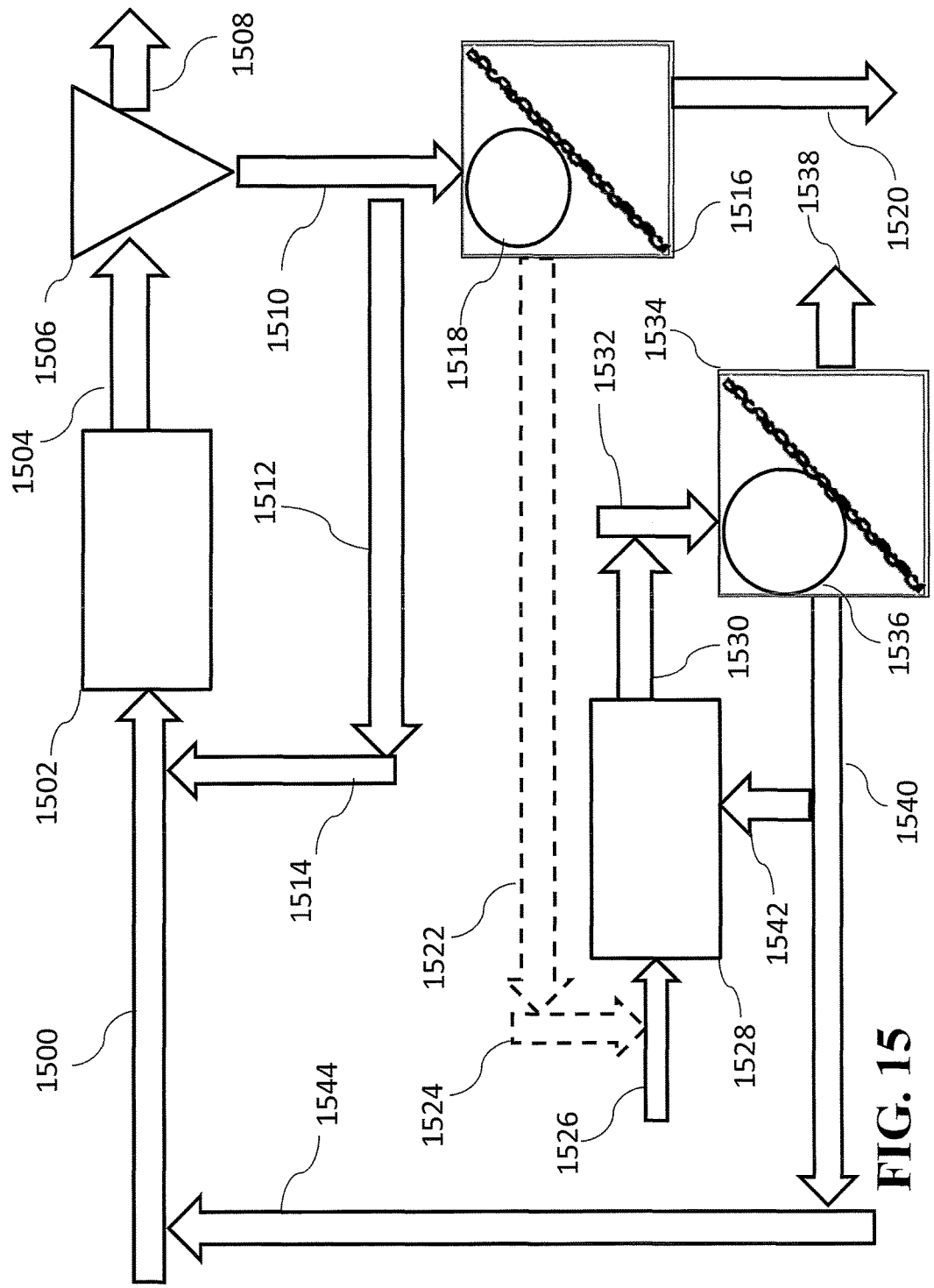
FIG. 15 is an additional flowchart showing a tank or system for an activated sludge process in accordance with an example embodiment, involving bio-augmentation of either screen-retained or pass-through fraction to an additional reactor tank which feeds an additional screen which allows retention or pass through of particles, which may also be recycled into the influent of the initial reactor tank such that bio-augmentation of the retained or pass through from either reactor may occur. In some embodiments exposure to inhibitors can be promoted in either reactor where the out-selection of organisms are desired.

An additional embodiment of the present disclosure is revealed by the flowchart in FIG. 15. Here influent flow 1500 is directed to a reactor/tank 1502 which discharges effluent 1504 into a clarifier 1506, said clarifier discharging scum effluent 1508 separately from retained sludge 1510, which is recycled along a path 1512, 1514 to the influent 1500, said sludge also separating to a screen assembly 1516 (that could be in various embodiments such as in FIG. 3, FIG. 4 or FIG. 5) where a separator including but not limited to a drum-sieve 1518 may be used to discharge waste biomass as pass through 1520 or in an optional embodiment send a portion 1522 along a path 1524 to the influent 1526 of an additional reactor tank 1528 which may further recycle mixed liquor 1530 along a path 1532 to another screen assembly 1534, further comprising a drum sieve apparatus 1536 which may discharge pass-through effluent 1538 or retained effluent 1540 along a path 1542 back to the secondary reactor 1528, or along a path 1544 to the influent 1500 to the primary reactor 1502. This approach provides for optional bioaugmentation of pass-through or retained solids between the two reactors 1502 and 1528, either one-way from one to another reactor or both ways between the two reactors.

Figure 16:
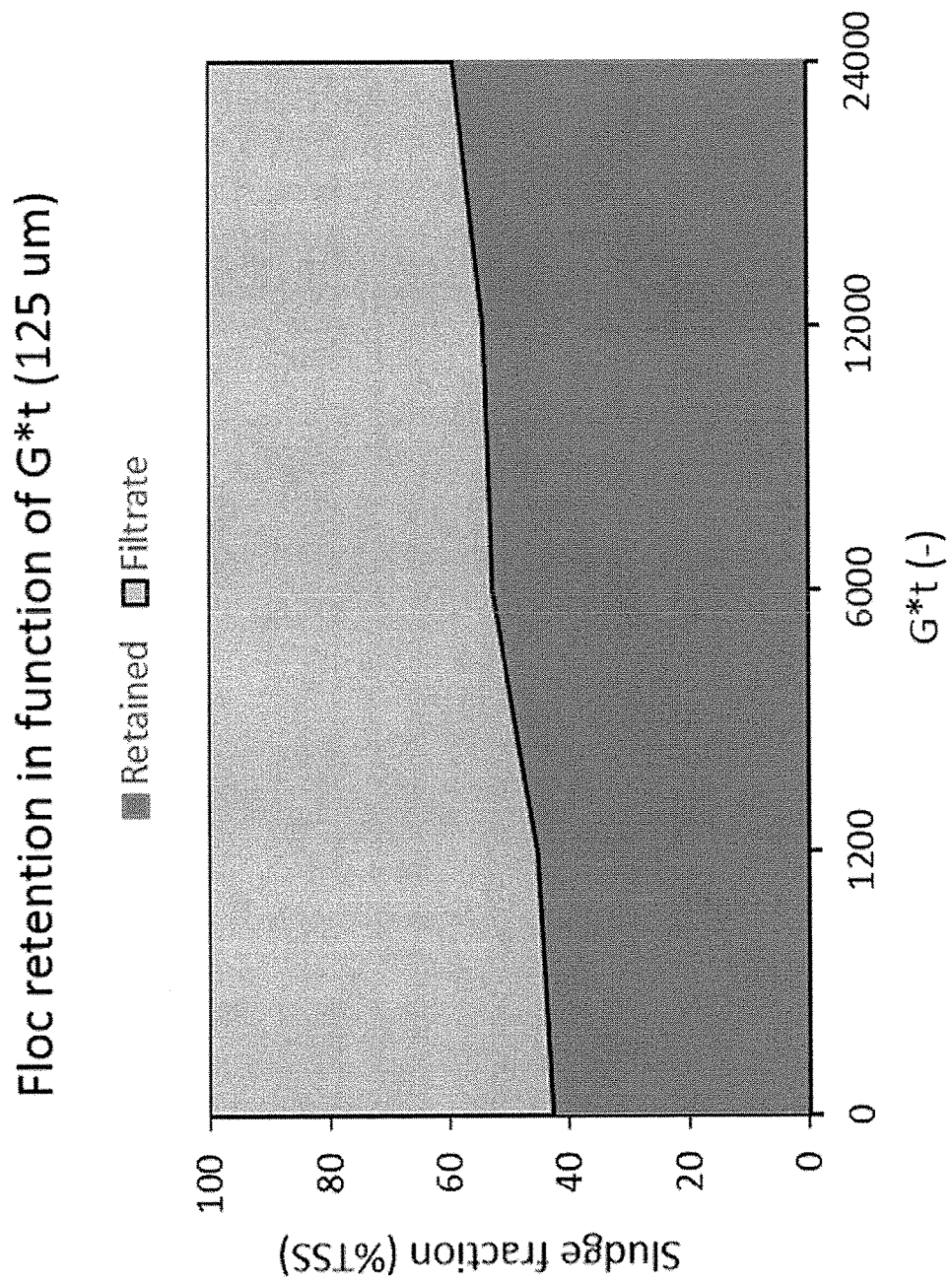
FIG. 16 is a graph showing flocculent retention as a function of G*t, where G is a velocity gradient and t is retention time.

Details of an embodiment of the present disclosure are shown in the graph of FIG. 16. After exposure of the activated sludge to different orthokinetic flocculation conditions, an increased retention of flocs was observed at higher G*t. In this particular test, a shear rate of 20 s$^{-1}$ was applied for 0-20 minute and retention of flocs was quantified on a 125 μm screen. A lower G*t will retain only the most easily flocculating material. Thus, flocculation efficiency can be adjusted by changing the G*t for selection.

Figure 17A:
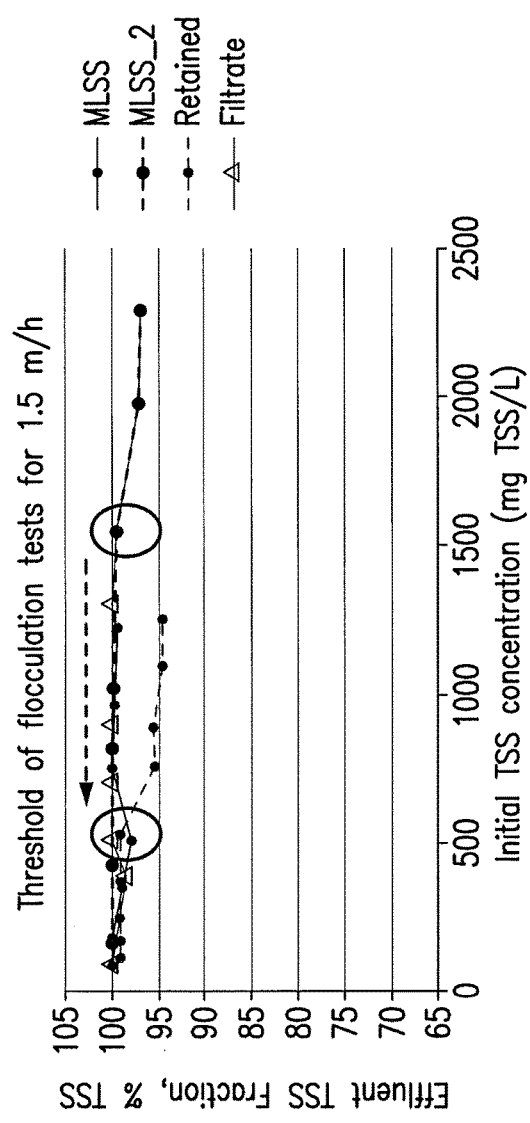
FIG. 17a and FIG. 17b are graphs showing the flocculation behavior of an activated sludge system before (mixed liquor, MLSS) and after screening through a 125 μm screen (retained, filtrate) determined through a measurement of the supernatant or effluent TSS after performing a selection on a critical settling velocity of 1.5 m/h (FIG. 17a) and 0.6 m/h (FIG. 17b) under different initial TSS concentrations.
Figure 17B:
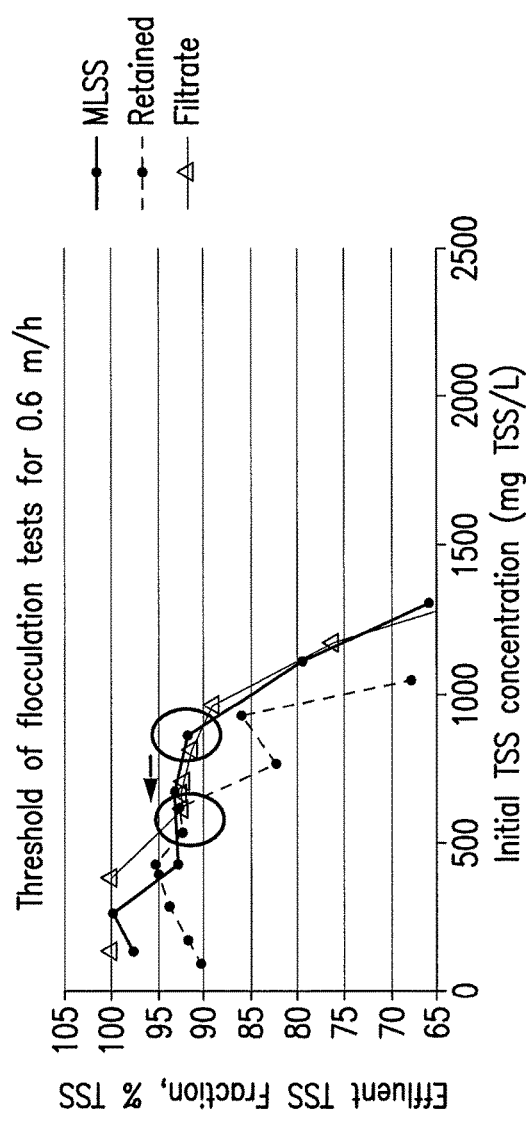

Details of another embodiment of the present disclosure are displayed in FIG. 17a and FIG. 17b. These figures show the flocculation behavior of an activated sludge system before (mixed liquor, MLSS) and after screening through a 125 μm screen (retained, filtrate). Flocculation behavior was determined through a measurement of the supernatant or effluent TSS after performing a selection based on a critical settling velocity of 1.5 m/h (FIG. 17a) and 0.6 m/h (FIG. 17b) under different initial TSS concentrations. Effluent TSS therefore represents the fraction of the solids with a settling velocity smaller than 1.5 and 0.6 m/h, respectively. A consistent drop in effluent TSS indicates the start of significant flocculation and is therefore referred to as the threshold of flocculation ("TOF"), or the minimum TSS needed to allow for flocculation to occur (see circles in FIG. 17a and FIG. 17b). The smaller this number, the earlier the drop occurs, thus indicating the sludge has better flocculation properties.

The retained and filtrate of the activated sludge was obtained after orthokinetic conditions corresponding to G*t of 2400, as represented in FIG. 16. On both the initial MLSS sample as well as both screen fractions (retained and filtrate), batch tests were performed to quantify the threshold of flocculation. Based on the testing, it could be concluded that the retained fraction showed better flocculation behavior with TOF numbers of 525 and 620 mg TSS/L for selection on critical settling velocity of 1.5 m/h (FIG. 17a) and 0.6 m/h (FIG. 17b), respectively. MLSS as well as filtrate showed high TOF values (1535 and 865 for mg TSS/L for selection based on critical settling velocity of 1.5 and 0.6 m/h, respectively) and thus limited flocculation.

Figure 18A:
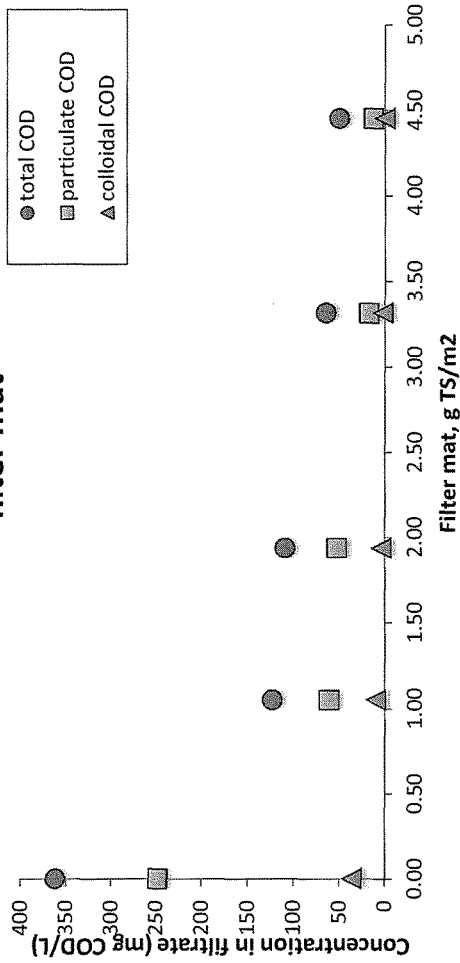
FIG. 18a is a graph comparing the enhanced removal of fines and colloids through filter mat for total chemical oxygen demand ("COD"), particulate COD, and colloidal COD with concentration in filtrate (Mg COD/L) measured against the filter mat (g TS/m2)
Figure 18B:
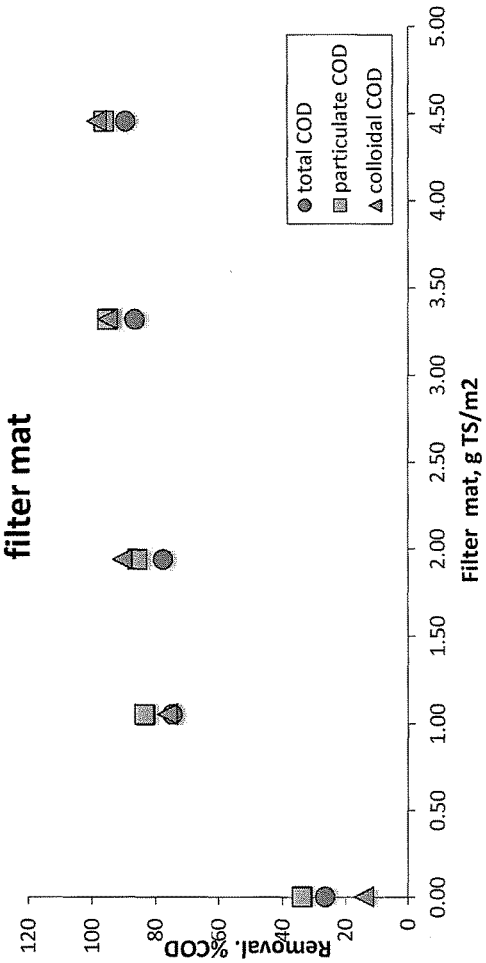
FIG. 18b is a graph comparing the enhanced removal of fines and colloids through filter mat for total COD, particulate COD, and colloidal COD with removal (% COD) measured against the filter mat (g TS/m2).

Data related to another embodiment of the present disclosure are displayed in two graphs in FIG. 18a and FIG. 18b. These figures show filtration of colloids and fine particulates with either concentration of filtrate in function of sludge layer on top (FIG. 18a) or removal percentage of COD (FIG. 18b). Raw wastewater with an initial total, particulate and colloidal COD concentration of 362, 250 and 36 mg COD/L, respectively, was brought onto a 125 μm sieve that had generated a filter mat (MLSS floc retention) of different thicknesses, expressed in g TS/m2. FIG. 18a shows the particulate and colloidal COD removal achieved and FIG. 18b shows that the removal efficiency was dependent on the floc filter mat formed or in the removal percentage of COD.

Figures 19A, 19B:
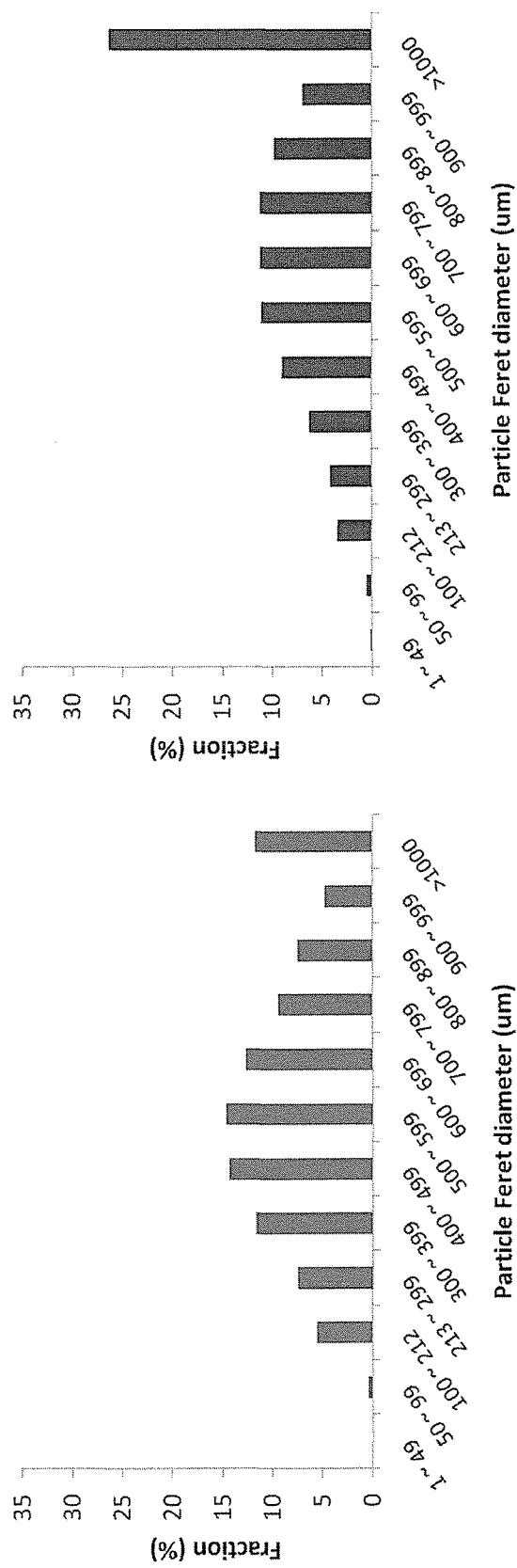
FIG. 19a and FIG. 19b are graphs comparing the screen selector vs cyclone with particle size distribution measured as Particle Feret diameter in micrometers vs Fraction (%).

Data related to additional embodiments on different dates are shown in the graphs of FIG. 19a and FIG. 19b. These figures show a full-scale process that was changed from the use of a cyclone for retention of anammox granules to a 50 μm screen for retention of anammox granules, which resulted in the retention of larger size particles with and average Feret diameter increasing from 500-599 μm to 600-699 μm.

FIG. 20a and FIG. 20b are graphs showing the distribution of anammox. FIG. 20b shows a large fraction of anammox in the retained and only a small fraction of anammox in the pass through. FIG. 20a shows a large fraction of the ammonia oxidizing bacteria ("AOB") (organism desired to be wasted more rapidly) is in the pass through effluent. The amount of AOB retained versus the amount in the pass through can be adjusted by increasing the filter mat on the screen, changing the screen size, or improving flocculation.

In the embodiments described above, multiple screens can be used that combine the approaches described in FIG. 5, FIG. 6, FIG. 7, FIG. 8, FIG. 9, FIG. 10, FIG. 11, FIG. 12, FIG. 13, FIG. 14 or FIG. 15. The approaches in these figures could also be operated in a batch or sequencing batch format if desired.

The invention is not limited to the structures, methods and instrumentalities described above and shown in the drawings. The invention is defined by the claims set forth below.

What is claimed and desired to be protected by Letters Patent of the United States is:

1. An apparatus for selecting and retaining selected particles, the apparatus comprising:
    an upstream portion;
    a size exclusion-based separation device for selecting the selected particles from an influent, wherein the size exclusion-based separation device is configured with a size exclusion means in the 10-5,000 micron range, wherein the apparatus is configured such that the selected particles include at least one of activated sludge solids, organic material, organisms, or biomass, wherein the influent is at least one of a wastewater influent, an effluent from a solids-liquid separator, or a mixed liquor from a tank, and wherein the size exclusion-based separation device is located downstream from the upstream portion; and
    a return device for returning at least some of the selected particles from the size exclusion-based separation device to the upstream portion; and
    wherein the apparatus is configured to control a filter mat by (1) optimizing size exclusion or (2) managing rotational speed or vibration, manually or automatically, using an analytical or detection instrument, to optimize selection or retention of organisms or particles.

2. The apparatus of claim 1, further comprising at least one pass through effluent.

3. The apparatus of claim 2, wherein the selected particles include biomass waste.

4. The apparatus of claim 2, wherein the particles selected by the size exclusion-based separation device include a large portion of anammox organisms.

5. The apparatus of claim 1, wherein the tank is configured for anaerobic and aerobic processing, or to create conditions for differential diffusion of a substrate, or to create conditions for differential oxidation-reduction, in space or time, that promote storage, or allows for plug flow conditions, or feast or famine regimes.

6. The apparatus of claim 1, where the size exclusion-based separation device can be used for a primary, secondary, tertiary or side stream process.

7. The apparatus of claim 1, further comprising a solids-liquid separator, and wherein the size exclusion-based separation device is separate from the solids-liquid separator.

8. The apparatus of claim 7, wherein the size exclusion-based separation device includes a classifying screen, and wherein the influent is fed into the solids-liquid separator before being fed into the classifying screen.

9. An apparatus for selecting and retaining selected particles, the apparatus comprising:
an upstream portion;
a size exclusion-based separation device for selecting the selected particles from an influent, wherein the size exclusion-based separation device is configured for size exclusion in the 10-5,000 micron range, wherein the apparatus is configured such that the selected particles include at least one of activated sludge solids, organic material, organisms, or biomass, wherein the influent is at least one of a wastewater influent, an effluent from a solids-liquid separator, or a mixed liquor from a tank, and wherein the size exclusion-based separation device is located downstream from the upstream portion; and
a return device for returning at least some of the selected particles from the size exclusion-based separation device to the upstream portion; and
wherein the selected particles are bioaugmented to a separate biological system or an upstream tank in order to enhance process rates or performance in the bioaugmented system, or in ways that the particles from the two systems can be swapped.

10. An apparatus for selecting and retaining selected particles, the apparatus comprising:
an upstream portion;
a size exclusion-based separation device for selecting the selected particles from an influent, wherein the size exclusion-based separation device is configured with a size-exclusion means in the 10-5,000 micron range, wherein the apparatus is configured such that the selected particles include at least one of activated sludge solids, organic material, organisms, or biomass, wherein the influent is at least one of a wastewater influent, an effluent from a solids-liquid separator, or a mixed liquor from a tank, and wherein the size exclusion-based separation device is located downstream from the upstream portion; and
a return device for returning at least some of the selected particles from the size exclusion-based separation device to the upstream portion; and
wherein the selected particles are exposed to: a stimulant or stimulating conditions, inhibitor or toxicant, in order to either respectively, increase process rates or performance, or, reduce process rates or performance of particles that need to either be respectively, selected, or out-selected from the tank or system.

11. An apparatus for selecting and retaining selected particles, the apparatus comprising:
an upstream portion;
a size exclusion-based separation device for selecting the selected particles from an influent, wherein the size exclusion-based separation device is configured for size-exclusion in the 10-5,000 micron range, wherein the apparatus is configured such that the selected particles include at least one of activated sludge solids, organic material, organisms, or biomass, wherein the influent is at least one of a wastewater influent, an effluent from a solids-liquid separator, or a mixed liquor from a tank, and wherein the size exclusion-based separation device is located downstream from the upstream portion; and
a return device for returning at least some of the selected particles from the size exclusion-based separation device to the upstream portion; and
wherein the apparatus is optionally monitored or controlled by an analytical or detection instrument in order to promote orthokinetic effects by exposing the influent to a shear rate of approximately between 0-150 $s^{-1}$ and time of approximately 0-15 minutes to promote net agglomeration of particles; or within these values or well in excess of these values to promote net breakup of particles, whichever is desired; and; and
wherein the apparatus further comprises an analytical or detection instrument, operated manually or automatically, that controls the shear rate or flocculation or break-up time to optimize selection or retention of flocculating or shear resistant organisms or particles.

12. An apparatus for selecting and retaining selected particles, the apparatus comprising:
an upstream portion;
a size exclusion-based separation device for selecting the selected particles from an influent, wherein the size exclusion-based separation device is configured for size-exclusion in the 10-5,000 micron range, wherein the apparatus is configured such that the selected particles include at least one of activated sludge solids, organic material, organisms, or biomass, wherein the influent is at least one of a wastewater influent, an effluent from a solids-liquid separator, or a mixed liquor from a tank, and wherein the size exclusion-based separation device is located downstream from the upstream portion; and
a return device for returning at least some of the selected particles from the size exclusion-based separation device to the upstream portion; and
wherein the size exclusion-based separation device includes a filter mat, and wherein fine particles or colloids accumulate on the filter mat improving filtration.

13. The apparatus of claim 12, wherein the size exclusion-based separation device includes a filter mat, and wherein the apparatus further comprises an analytical or detection instrument, operated manually or automatically, that controls the filter mat by optimizing screen size and by managing normal or tangential forces that promote compression or shear to optimize selection or retention of organisms or particles.

14. An apparatus for selecting and retaining selected particles, the apparatus comprising:
an upstream portion;
a size exclusion-based separation device for selecting the selected particles from an influent, wherein the size exclusion-based separation device is configured with a size-exclusion means in the 10-5,000 micron range, wherein the apparatus is configured such that the selected particles include at least one of activated sludge solids, organic material, organisms, or biomass, wherein the influent is at least one of a wastewater influent, an effluent from a solids-liquid separator, or a mixed liquor from a tank, and wherein the size exclusion-based separation device is located downstream from the upstream portion; and a return device for returning at least some of the selected particles from the size exclusion-based separation device to the upstream portion; and wherein the apparatus is configured to recycle at least a portion of a pass through of the size exclusion-based separation device, to an influent wastewater holding tank to perform pre-denitrification or dilution to reduce inhibition.

15. An apparatus for treatment of ammonia, the apparatus comprising:

an anammox reactor;

a discharge device for discharging an effluent from the anammox reactor, the effluent containing nitrate;

a pre-denitrification tank; and a screening device for separating anammox organisms from other organisms;

wherein the pre-denitrification tank is located upstream of the anammox reactor, wherein the screening device is located downstream from the anammox reactor and upstream from the pre-denitrification tank, and wherein at least a portion of the effluent is recycled to the pre-denitrification tank for dilution of influent wastewater, for reducing inhibition, or, for degrading organics.

* * * * *